United States Patent
Senesac et al.

(10) Patent No.: US 10,379,524 B2
(45) Date of Patent: Aug. 13, 2019

(54) MANAGEMENT OF A DISPLAY OF AN ASSEMBLY MODEL

(71) Applicant: The Boeing Company, Chicago, IL (US)

(72) Inventors: Christopher J. Senesac, Daniel Island, SC (US); David J. Kasik, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 447 days.

(21) Appl. No.: 14/751,446

(22) Filed: Jun. 26, 2015

(65) Prior Publication Data
US 2016/0378099 A1 Dec. 29, 2016

(51) Int. Cl.
*G06Q 10/00* (2012.01)
*G06F 3/0481* (2013.01)
*G06T 19/20* (2011.01)
*G05B 19/4093* (2006.01)

(52) U.S. Cl.
CPC ....... *G05B 19/4093* (2013.01); *G06F 3/0481* (2013.01); *G06Q 10/00* (2013.01); *G06T 19/20* (2013.01); *G05B 2219/31472* (2013.01); *G05B 2219/37081* (2013.01); *G06T 2219/2008* (2013.01)

(58) Field of Classification Search
CPC ........ G06F 3/0481; G06Q 10/00; G06T 19/20
See application file for complete search history.

(56) References Cited

U.S. PATENT DOCUMENTS

| | | | |
|---|---|---|---|
| 7,075,531 B1 | 7/2006 | Ando et al. | |
| 7,250,947 B2 | 7/2007 | Piccuezzu et al. | |
| 8,452,435 B1 | 5/2013 | Vieilly et al. | |
| 2003/0229478 A1* | 12/2003 | Rappaport | H04W 16/20 703/13 |
| 2004/0119717 A1 | 6/2004 | Furumoto et al. | |
| 2006/0053071 A1 | 3/2006 | Yamada et al. | |
| 2007/0216681 A1 | 9/2007 | Nishida et al. | |
| 2008/0111822 A1* | 5/2008 | Horowitz | H04N 5/44591 345/530 |

(Continued)

FOREIGN PATENT DOCUMENTS

JP H07239866 A 9/1995

OTHER PUBLICATIONS

Extended European Search Report, dated Nov. 3, 2016, regarding Application No. EP16166566.6, 7 pages.

*Primary Examiner* — Jennifer N To
*Assistant Examiner* — Ashley M Fortino
(74) *Attorney, Agent, or Firm* — Yee & Associates, P.C.

(57) ABSTRACT

A method and apparatus for managing a display of an assembly model. The assembly model is displayed in an initial state within a first display area in a graphical user interface. A first display state of an item of the assembly model is changed to a second display state within the first display area in response to receiving a first type of input. The second display state of the item of the assembly model is changed to a third display state within the first display area in response to receiving a second type of input. An entry is added to an assembly hierarchy within a second display area in the graphical user interface in response to the second display state of the item changing to the third display state.

16 Claims, 23 Drawing Sheets

(56) References Cited

U.S. PATENT DOCUMENTS

| | | | |
|---|---|---|---|
| 2008/0228450 A1* | 9/2008 | Jakobsen | G06T 17/10 |
| | | | 703/2 |
| 2010/0262453 A1* | 10/2010 | Robinson | G06Q 10/08 |
| | | | 705/330 |
| 2010/0302242 A1* | 12/2010 | Buchanan | G06F 17/50 |
| | | | 345/420 |
| 2012/0130521 A1* | 5/2012 | Kohlhoff | G06T 19/00 |
| | | | 700/98 |
| 2013/0085936 A1* | 4/2013 | Law | G06Q 20/04 |
| | | | 705/40 |
| 2014/0118358 A1 | 5/2014 | Enomoto | |
| 2014/0245206 A1 | 8/2014 | Senesac | |
| 2014/0257552 A1 | 9/2014 | Senesac et al. | |
| 2014/0259596 A1 | 9/2014 | Senesac et al. | |
| 2014/0282183 A1 | 9/2014 | Senesac | |
| 2014/0310629 A1 | 10/2014 | Senesac et al. | |
| 2016/0062561 A1* | 3/2016 | Chandrasekaran | |
| | | | G06F 3/04842 |
| | | | 715/719 |

* cited by examiner

MANAGEMENT OF A DISPLAY OF AN ASSEMBLY MODEL

BACKGROUND INFORMATION

1. Field

The present disclosure relates generally to managing a display and, in particular, to managing a display of an assembly model. Still more particularly, the present disclosure relates to a method and apparatus for changing the display states of items in an assembly model and building an assembly hierarchy that tracks these changes in order.

2. Background

When working on an assembly in a factory, different types of personnel may make use of computer-aided three-dimensional visualization of the assembly. For example, quality assurance personnel, mechanic personnel, safety assurance personnel, and other types of personnel may use a computer display of a three-dimensional model of the assembly to understand details about the structure of the assembly during or before performing work on the assembly. This type of visualization may help reduce errors in the work that is performed on the assembly.

For example, without limitation, when working with an assembly, such as an aircraft, a mechanic or technician may be interested in viewing the digital components of the aircraft that may affect repairs that are to be performed. However, these components may be located behind the fuselage skins of the aircraft, behind interior walls of the aircraft, or behind other structural components of the aircraft.

With currently available display systems, a user may be required to know a certain level of information about the parts that make up an aircraft to be able to find a particular part within a model of the aircraft. For example, the user might need to know the type of aircraft to be worked on, an identifier for the part, the volume area of the part in the aircraft, and other types of information about the part.

These types of display systems may be designed for persons in the engineering community who are educated with the requisite information. However, other types of personnel may not know the requisite information or have easy access to the requisite information. Therefore, it would be desirable to have a method and apparatus that take into account at least some of the issues discussed above, as well as other possible issues.

SUMMARY

In one illustrative embodiment, a method for managing a display of an assembly model is provided. The assembly model is displayed in an initial state within a first display area in a graphical user interface. A first display state of an item of the assembly model is changed to a second display state within the first display area in response to receiving a first type of input. The second display state of the item of the assembly model is changed to a third display state within the first display area in response to receiving a second type of input. An entry is added to an assembly hierarchy within a second display area in the graphical user interface in response to the second display state of the item changing to the third display state.

In another illustrative embodiment, a method for managing a display of an assembly model that represents a physical assembly is provided. The assembly model is displayed in an initial state within a first display area in a graphical user interface. The initial state of the assembly model displayed in the graphical user interface is changed to a selected state for the assembly model. The selected state for the assembly model is chosen to aid in performing at least one task on the physical assembly. An assembly hierarchy is built dynamically in a second display area of the graphical user interface during changing of the initial state of the assembly model to the selected state. The assembly hierarchy tracks a sequence of how the initial state of the assembly model displayed in the graphical user interface changes to the selected state for the assembly model.

In yet another illustrative embodiment, an apparatus comprises a display manager. The display manager displays a graphical user interface. The graphical user interface comprises a first display area and a second display area. The first display area visually presents an assembly model in an initial state. The first display state of an item of the assembly model is changed in response to receiving a first type of input. A second display state of the item is changed to a third display state in response to receiving a second type of input. The second display area visually presents an assembly hierarchy that tracks a sequence of how the initial state of the assembly model changes to a selected state within the first display area.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method and apparatus for enabling a user to visualize an assembly model and easily manipulate the assembly model to view inner components of the assembly model. Further, it may be desirable to have a display system that eliminates the need for a user to know specific information about a part to find that part within an assembly model and visualize that part.

Thus, the illustrative embodiments provide a method and apparatus for managing a display of an assembly model. In one illustrative example, an assembly model is displayed in an initial state within a first display area in a graphical user interface. A first display state of an item of the assembly model may be changed to a second display state within the first display area in response to receiving a first type of input. The second display state of the item may be changed to a third display state within the first display area in response to receiving a second type of input. In response to the second display state of the item changing to the third display state, an entry is added to an assembly hierarchy within a second display area in the graphical user interface.

In one illustrative example, the first display state may be a solid view, the second display state may be a transparent view, and the third display state may be a hidden view. The steps of changing the first display state of the item, changing the second display state of the item, and adding the entry to the assembly hierarchy may be repeated until a selected state of the assembly model is displayed within the first display area. In this manner, the assembly hierarchy tracks a sequence of how the initial state of the assembly model displayed in the first display area of the graphical user interface changes to the selected state for the assembly model.

Figure 1:
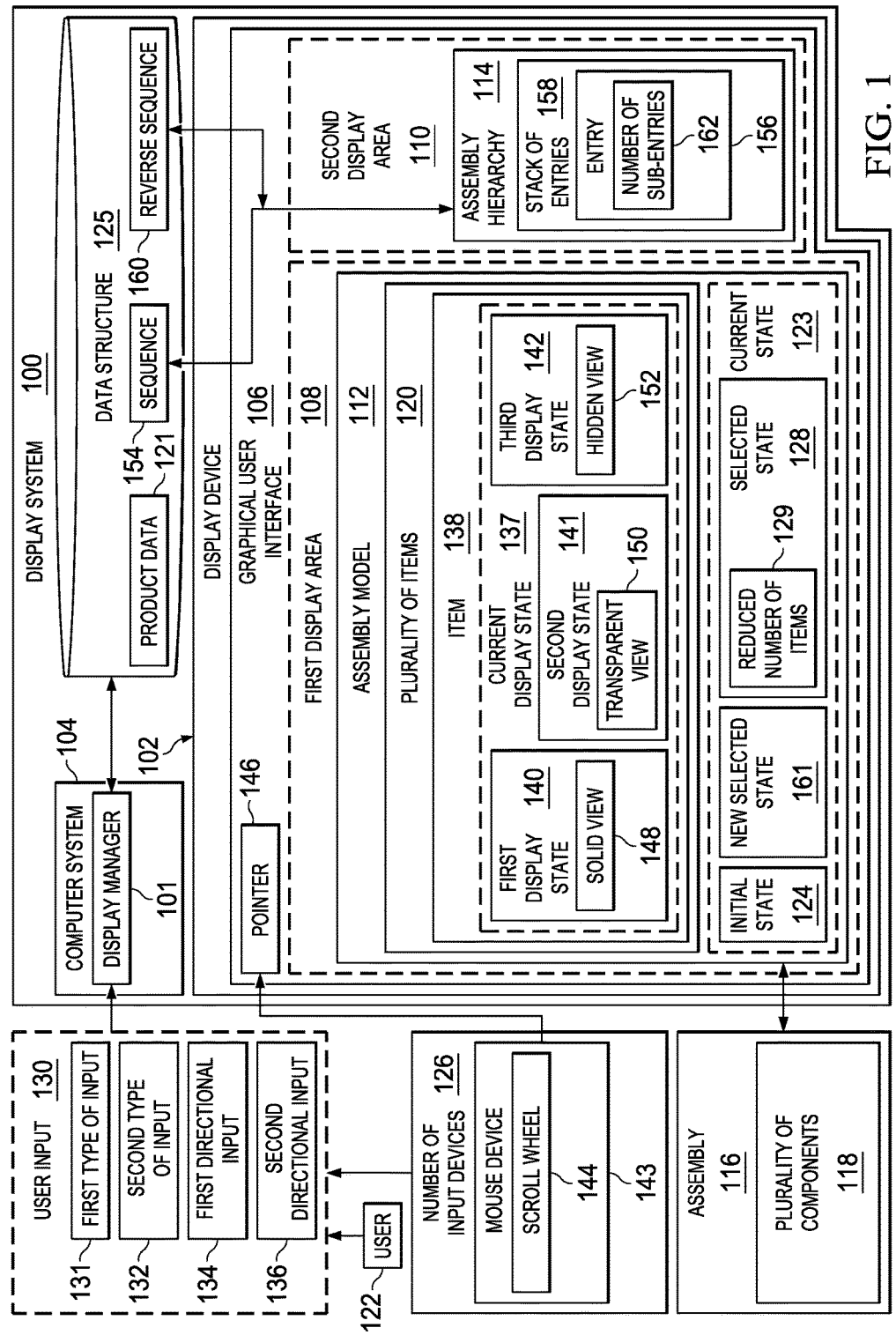
FIG. 1 is an illustration of a display system in the form of a block diagram in accordance with an illustrative embodiment.

Referring now to the figures and, in particular, with reference to FIG. 1, an illustration of a display system is depicted in the form of a block diagram in accordance with an illustrative embodiment. In this illustrative example, display system 100 may include display manager 101 and display device 102.

Display manager 101 may be implemented using software, hardware, firmware, or a combination thereof. When software is used, the operations performed by display manager 101 may be implemented using, for example, without limitation, program code configured to run on a processor unit. When firmware is used, the operations performed by display manager 101 may be implemented using, for example, without limitation, program code and data and stored in persistent memory to run on a processor unit.

When hardware is employed, the hardware may include one or more circuits that operate to perform the operations performed by display manager 101. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one illustrative example, display manager 101 is implemented in computer system 104. Computer system 104 may be comprised of one or more computers, depending on the implementation. When multiple computers form computer system 104, these computers may be in communication with each other.

Display manager 101 may be in communication with display device 102. As depicted, display manager 101 manages graphical user interface 106 displayed on display device 102. Graphical user interface 106 includes first display area 108 and second display area 110. In this illustrative example, display manager 101 manages the visual presentation of assembly model 112 within first display area 108 and assembly hierarchy 114 in second display area 110.

Assembly model 112 may be a three-dimensional digital representation of assembly 116. Assembly 116 may be a physical assembly that exists either completely or partially or that is theoretical. For example, without limitation, assembly 116 may be an aircraft or collection of airplane parts that is still in the design stage, is in the process of being manufactured, or is fully manufactured.

As depicted, assembly 116 may comprise plurality of components 118. Each component of plurality of components 118 may take the form of an individual part, a group of parts, a sub-assembly, an assembly, a surface of a part, or some other type of component. Assembly model 112 may include plurality of items 120 that represent plurality of components 118.

Display manager 101 uses product data 121 stored in data structure 125 to manage the display of assembly model 112 in graphical user interface 106. Product data 121 may include assembly model 112 and information about assembly 116 represented by assembly model 112. In some cases, product data 121 may include other assembly models and information about the assemblies represented by those assembly models.

Data structure 125 may be implemented as part of computer system 104, independently of computer system 104, or both, depending on the implementation. Data structure 125 may take a number of different forms. Data structure 125 may be comprised of, for example, without limitation, at least one of a database, associative memory, some other type of memory, or some other type of data storage.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; or item B and item C. In some cases, "at least one of item A, item B, or item C" or "at least one of item A, item B, and item C" may mean, but is not limited to, two of item A, one of item B, and ten of item C; four of item B and seven of item C; or some other suitable combination.

Display manager 101 enables a user, such as user 122, to manipulate the visual presentation of assembly model 112 in graphical user interface 106. In particular, display manager 101 may enable user 122 to expose the items of plurality of items 120 that are not visible to the naked eye in current state 123 of assembly model 112 displayed.

For example, without limitation, assembly model 112 may be displayed in initial state 124 within first display area 108 in graphical user interface 106. Initial state 124 may be, in some cases, a default state for assembly model 112.

User 122 may enter user input 130 through number of input devices 126 to change initial state 124 of assembly model 112 to selected state 128. As used herein, a "number of" items may include one or more items. In this manner, number of input devices 126 may include one or more input devices in communication with graphical user interface 106 and display manager 101.

Selected state 128 may be a state in which not all of plurality of items 120 are displayed. In selected state 128, reduced number of items 129 may be displayed.

In one illustrative example, user 122 may use number of input devices 126 to enter multiple types of user input 130. For example, number of input devices 126 may be used to enter first type of input 131, second type of input 132, first directional input 134, and second directional input 136. These different types of inputs may be used to change current display state 137 of item 138 in plurality of items 120 of assembly model 112.

Current display state 137 may be changed between first display state 140, second display state 141, and third display state 142. For example, display manager 101 receives first type of input 131 from number of input devices 126. First type of input 131 may be received in associated with item 138. In response to receiving first type of input 131, display manager 101 changes first display state 140 of item 138 to second display state 141.

In one illustrative example, an input device in number of input devices 126 may take the form of mouse device 143. Mouse device 143 may include scroll wheel 144 that is capable of being rolled, clicked, or rolled and clicked simultaneously. Pointer 146 may be displayed in graphical user interface 106 to visually present the movement of and operation of mouse device 143. In this illustrative example, first type of input 131 may be a moving of pointer 146 over item 138.

Further, in one illustrative example, first display state 140 may be solid view 148 and second display state 141 may be transparent view 150. In this manner, user 122 may operate mouse device 143 such that pointer 146 is moved over item 138 in first display area 108 of graphical user interface 106. By causing pointer 146 to move over item 138, item 138 may be made transparent.

In these illustrative examples, transparent view 150 may be a view of a selected percentage of transparency. This selected percentage may be, for example, without limitation, between about 1 percent and about 99 percent transparency.

By changing solid view 148 of item 138 to transparent view 150, the portion of plurality of items 120 of assembly model 112 located behind or under item 138 may be exposed. User 122 may then make a determination as to whether current display state 137 is to be further changed.

User 122 may then enter second type of input 132. In one illustrative example, second type of input 132 may take the form of a selection of item 138 using pointer 146. For example, without limitation, scroll wheel 144 may be clicked by user 122 while pointer 146 is over item 138 to select item 138.

In response to receiving second type of input 132, display manager 101 changes second display state 141 to third display state 142. In one illustrative example, third display state 142 may be hidden view 152. By changing transparent view 150 of item 138 to hidden view 152 of item 138, item 138 may be effectively removed from the visual presentation of assembly model 112 within first display area 108. This removal may expose the portion of plurality of items 120 that were previously located behind or under item 138 and thereby not visible to the naked eye.

User 122 may then determine whether current state 123 of assembly model 112 displayed is selected state 128. If current state 123 of assembly model 112 displayed is not selected state 128, the process of identifying an item, selecting an item, and then effectively removing that item may be repeated for a number of items until selected state 128 for assembly model 112 is displayed in graphical user interface 106. In this manner, assembly model 112 may be effectively disassembled.

In these illustrative examples, assembly hierarchy 114 may be built within second display area 110 of graphical user interface 106 as display manager 101 changes initial state 124 of assembly model 112 to selected state 128 based on the input entered by user 122. In particular, assembly hierarchy 114 may track sequence 154 of how initial state 124 of assembly model 112 changes to selected state 128.

As one illustrative example, when second display state 141 of item 138 is changed to third display state 142, display manager 101 adds entry 156 to assembly hierarchy 114 displayed in graphical user interface 106. Entry 156 may identify item 138. In some illustrative examples, display manager 101 may use product data 121 stored in data structure 125 to retrieve an identifier for item 138 and create entry 156 that includes this identifier.

In other illustrative examples, display manager 101 may include an index number for item 138. For example, if item 138 is the first item to be effectively removed from the display of assembly model 112 during the process of changing initial state 124 of assembly model 112 to selected state 128, display manager 101 may assign an index number of "1" to item 138. Entry 156 may include this index number.

For each item of plurality of items 120 that is removed in changing initial state 124 of assembly model 112 to selected state 128, display manager 101 creates a corresponding entry and displays this entry in assembly hierarchy 114 built in second display area 110. In this manner, assembly hierarchy 114 may comprise stack of entries 158.

As assembly hierarchy 114 is built, display manager 101 tracks sequence 154 in which assembly hierarchy 114 is built. In some illustrative examples, display manager 101 may store sequence 154 in data structure 125 for future use. Depending on the implementation, storing sequence 154 may include storing assembly hierarchy 114 itself, information that identifies sequence 154 of the building or assembly hierarchy 114, or both. In some cases, sequence 154 may also be referred to as an assembly hierarchy sequence.

In some cases, display manager 101 may also identify and store reverse sequence 160 in data structure 125. Reverse sequence 160 may be the reverse of sequence 154.

The various states between and including initial state 124 and selected state 128 may be traversed using sequence 154 and reverse sequence 160. For example, once selected state 128 for assembly model 112 has been reached, user 122 may enter first directional input 134 through number of input devices 126. In one illustrative example, first directional input 134 may take the form of rolling scroll wheel 144 of mouse device 143 in a first direction.

In response to receiving first directional input 134, display manager 101 changes selected state 128 of assembly model 112 to new selected state 161 in reverse sequence 160. For example, display manager 101 may add each item of plurality of items 120 that was removed from the visual presentation of assembly model 112 in first display area 108 back to assembly model 112 according to reverse sequence 160 until new selected state 161 is reached.

New selected state 161 may be initial state 124 or some state between selected state 128 and initial state 124. New selected state 161 may be determined by first directional input 134. For example, a number of steps of the rolling of scroll wheel 144 may determine how far towards initial state 124 the display of assembly model 112 is changed.

To return to selected state 128 or some state between new selected state 161 and selected state 128, user 122 may enter second directional input 136. Second directional input 136 may be, for example, without limitation, a rolling of scroll wheel 144 in a second direction. In these illustrative examples, first directional input 134 and second directional input 136 may correspond to opposite directions.

In response to receiving second directional input 136, display manager 101 may change new selected state 161 to another state that is selected state 128 or between new selected state 161 and selected state 128 according to sequence 154. In this manner, user 122 may be able to quickly traverse through the visual presentation of a disassembling of and reassembly of assembly model 112 within first display area 108.

In some cases, when item 138 represents a sub-assembly or assembly, user 122 may desire to dynamically select only a portion of item 138 to be hidden. In one illustrative example, entry 156 in assembly hierarchy 114 in second display area 110 may be expanded to reveal number of sub-entries 162. Each of number of sub-entries 162 may identify, for example, a number of sub-items that make up item 138. For example, when item 138 represents a sub-assembly, number of sub-entries 162 may identify a number of sub-items that represent at least one of a part, a sub-assembly, or other component that makes up the sub-assembly. By hiding only a portion of item 138, user 122 may be able to selectively remove sub-items, which may enhance the fidelity of the process.

In this manner, display system 100 enables a user, such as user 122, to create sequence 154 for the disassembly of at least a portion of assembly 116 without user 122 needing to know detailed information about assembly 116 and plurality of components 118 that make up assembly 116. Consequently, different types of personnel outside of engineers may be given the ability to visualize a disassembly and reassembly of assembly 116 through the changing states of assembly model 112 displayed in graphical user interface 106.

Depending on the implementation, at least one task related to assembly 116 represented by assembly model 112 may be performed using the display of assembly model 112 in selected state 128. The task may include, for example, without limitation, at least one of repairing a part, replacing a part, imaging a part, installing a part, testing a part, marking a part, or performing some other type of task.

Further, by visually presenting the building of assembly hierarchy 114 in correspondence with the display of assembly model 112 in graphical user interface 106, display system 100 enables user 122 to monitor and track sequence 154 of disassembly and reverse sequence 160 of reassembly. Sequence 154 and reverse sequence 160 may be stored for future use and performing quality assurance checks.

The illustration of display system 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, although first display state 140, second display state 141, and third display state 142 are described above as being solid view 148, transparent view 150, and hidden view 152, respectively, these display states may take other forms. In some illustrative examples, each of these display states may be a unique display state that is visibly distinguishable from the other display states.

In this manner, changing from one display state to another display state may be performed in a number of different ways. For example, without limitation, changing first display state 140 of item 138 to second display state 141 may include at least one of changing a color of at least a portion of item 138, changing solid view 148 to a line view, changing solid view 148 to a line-vector view, highlighting at least a portion of item 138, displaying a number of graphical indicators in association with item 138, or changing the appearance of item 138 in some other manner. Changing second display state 141 to third display state 142 may include, for example, without limitation, at least one of changing a line view or line-vector view to hidden view 152, changing a color of at least a portion of item 138, changing solid view 148 to a line or line-vector view, changing a line view to transparent view 150, or changing the appearance of item 138 in some other manner.

Figure 2:
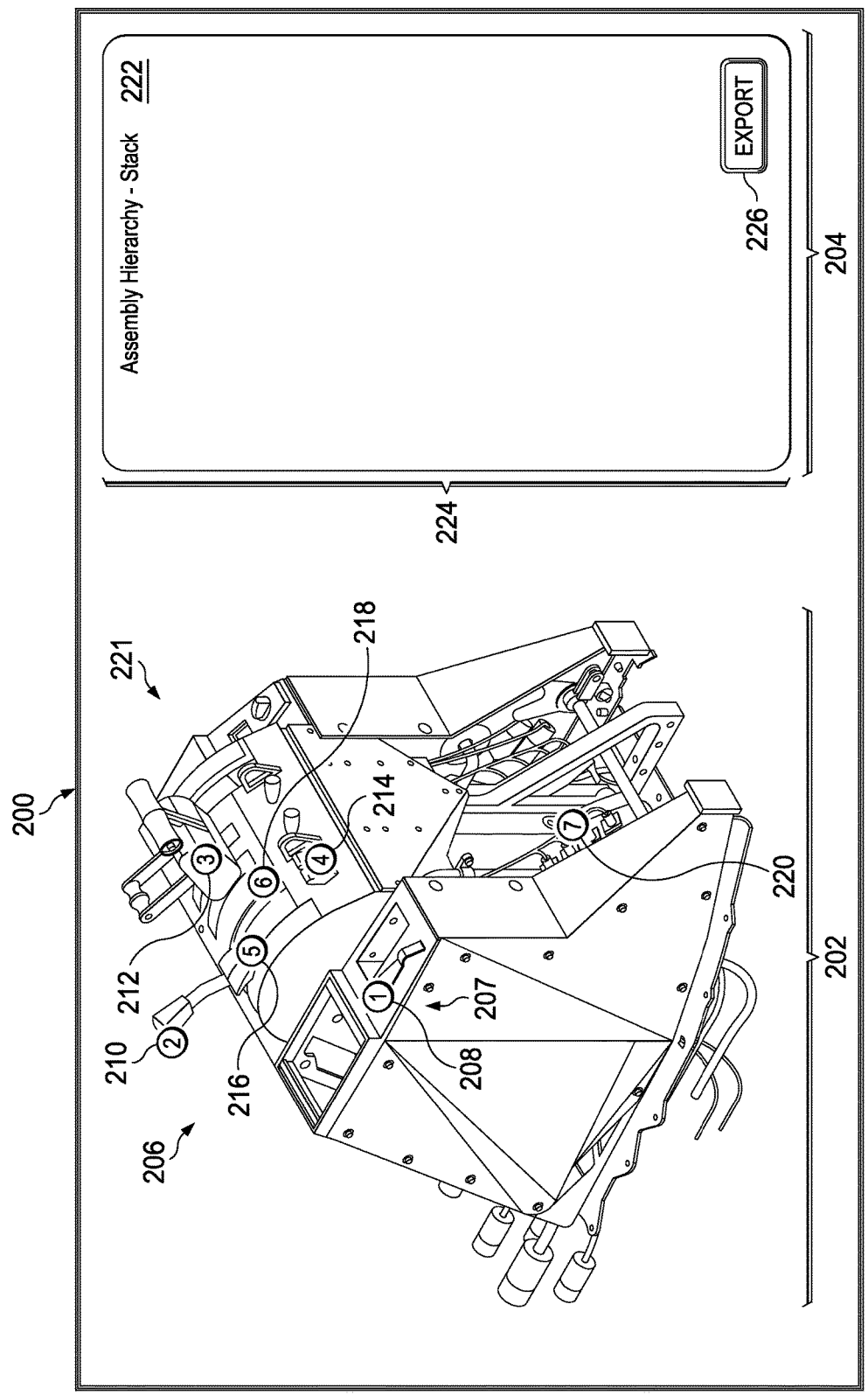
FIG. 2 is an illustration of a graphical user interface in accordance with an illustrative embodiment.

With reference now to FIG. 2, an illustration of a graphical user interface is depicted in accordance with an illustrative embodiment. In this illustrative example, graphical user interface 200 may be an example of one implementation for graphical user interface 106 in FIG. 1. Graphical user interface 200 may be displayed on a display device, such as display device 102 in FIG. 1.

As depicted, graphical user interface 200 includes first display area 202 and second display area 204. First display area 202 and second display area 204 may be examples of implementations for first display area 108 and second display area 110, respectively.

In this illustrative example, assembly model 206 is displayed within first display area 202. Assembly model 206 may be an example of one implementation for assembly model 112 in FIG. 1. As depicted, assembly model 206 includes plurality of items 207, which may be an example of one implementation for plurality of items 120 in FIG. 1.

Plurality of items 207 include first item 208, second item 210, third item 212, fourth item 214, fifth item 216, sixth item 218, and seventh item 220. Each item in plurality of items 207 is shown in solid view in this illustrative example.

Assembly model 206 is a three-dimensional digital representation of a physical throttle assembly for a physical aircraft. Each of plurality of items 207 represents an assembly that makes up this throttle assembly. A user may use the display of assembly model 206 having initial state 221 in graphical user interface 200 to create a sequence disassembling a portion of the throttle assembly to perform a repair. This sequence may be used to build an assembly hierarchy within display box 222 in second display area 204.

Area 224 within display box 222 may be used to display entries that track the removal of items from assembly model 206 displayed in first display area 202. Export button 226 may be selected to export the assembly hierarchy and corresponding sequence created for storage in data structure.

With reference now to FIGS. 3-18, illustrations of a process for building an assembly hierarchy are depicted in accordance with an illustrative embodiment. In particular, an initial state of assembly model 206 displayed in graphical user interface 200 in FIG. 2 may be changed to a selected state for assembly model 206 by a display manager, such as display manager 101 in FIG. 1.

Figure 3:
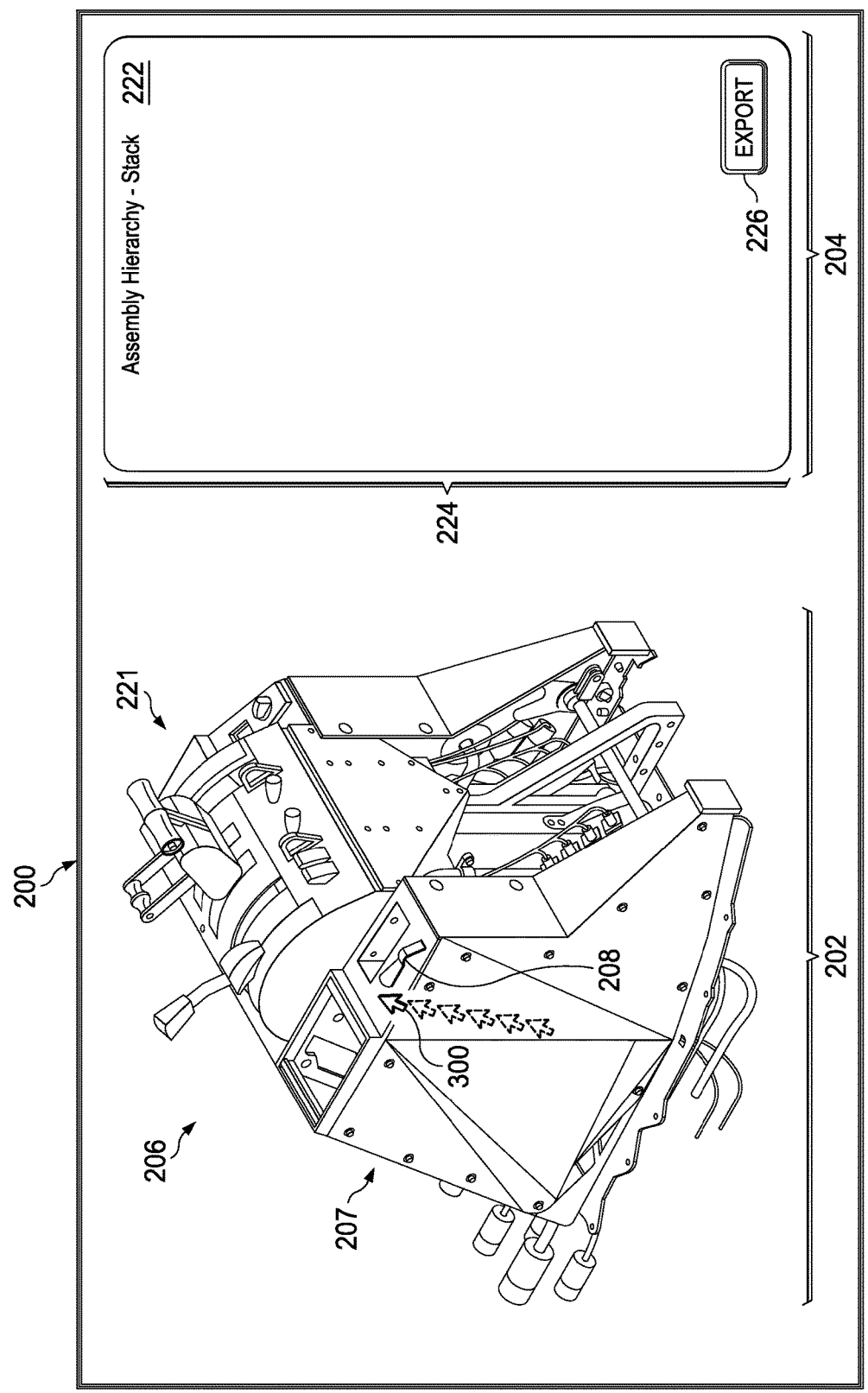
FIG. 3 is an illustration of an assembly model displayed within a first display area of a graphical user interface in an initial state in accordance with an illustrative embodiment.

Turning now to FIG. 3, assembly model 206 is displayed within first display area 202 of graphical user interface 200 in initial state 221. Initial state 221 is an example of one implementation for initial state 124 in FIG. 1. Pointer 300 is moved towards first item 208 of assembly model 206. Pointer 300 may be an example of one implementation for pointer 146 in FIG. 1.

Figure 4:
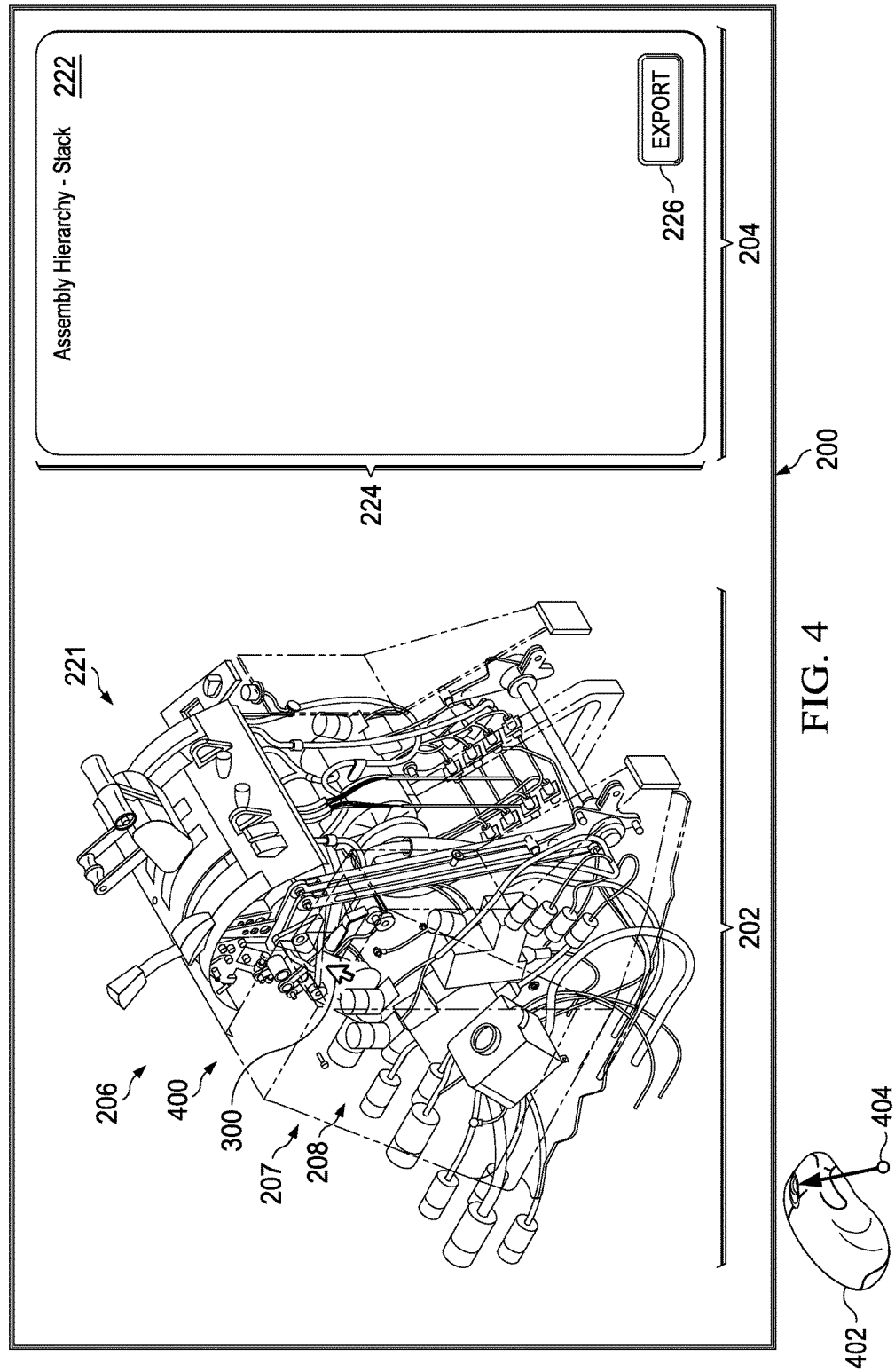
FIG. 4 is an illustration of a pointer moved over a first item of an assembly model in accordance with an illustrative embodiment.

In FIG. 4, pointer 300 is moving over first item 208. This moving of pointer 300 may be an example of one implementation for first type of input 131 in FIG. 1.

In response to pointer 300 being moved over first item 208, the display manager changes a solid view of first item 208 to transparent view 400 of first item 208. In particular, all of the sub-items that make up first item 208 are made transparent to enable first item 208 to be distinguished from the rest of assembly model 206. Further, by making first item 208 transparent, other items that make up assembly model 206 that are behind or under first item 208 may be exposed.

As depicted, a user may use mouse 402 having scroll wheel 404 to manipulate pointer 300 and interact with both the display manager and graphical user interface 200. Mouse 402 with scroll wheel 404 may be an example of one implementation for mouse device 143 with scroll wheel 144 in FIG. 1.

Transparent view 400 of first item 208 may be changed to a hidden view in response to a click of scroll wheel 404, while pointer 300 is over first item 208. In other words, first item 208 may be removed from the display of assembly model 206. This removal may represent a disassembling of the corresponding assembly represented by first item 208 from the throttle assembly represented by assembly model 206. The clicking of scroll wheel 404 may be an example of one implementation for second type of input 132 in FIG. 1.

Figure 5:
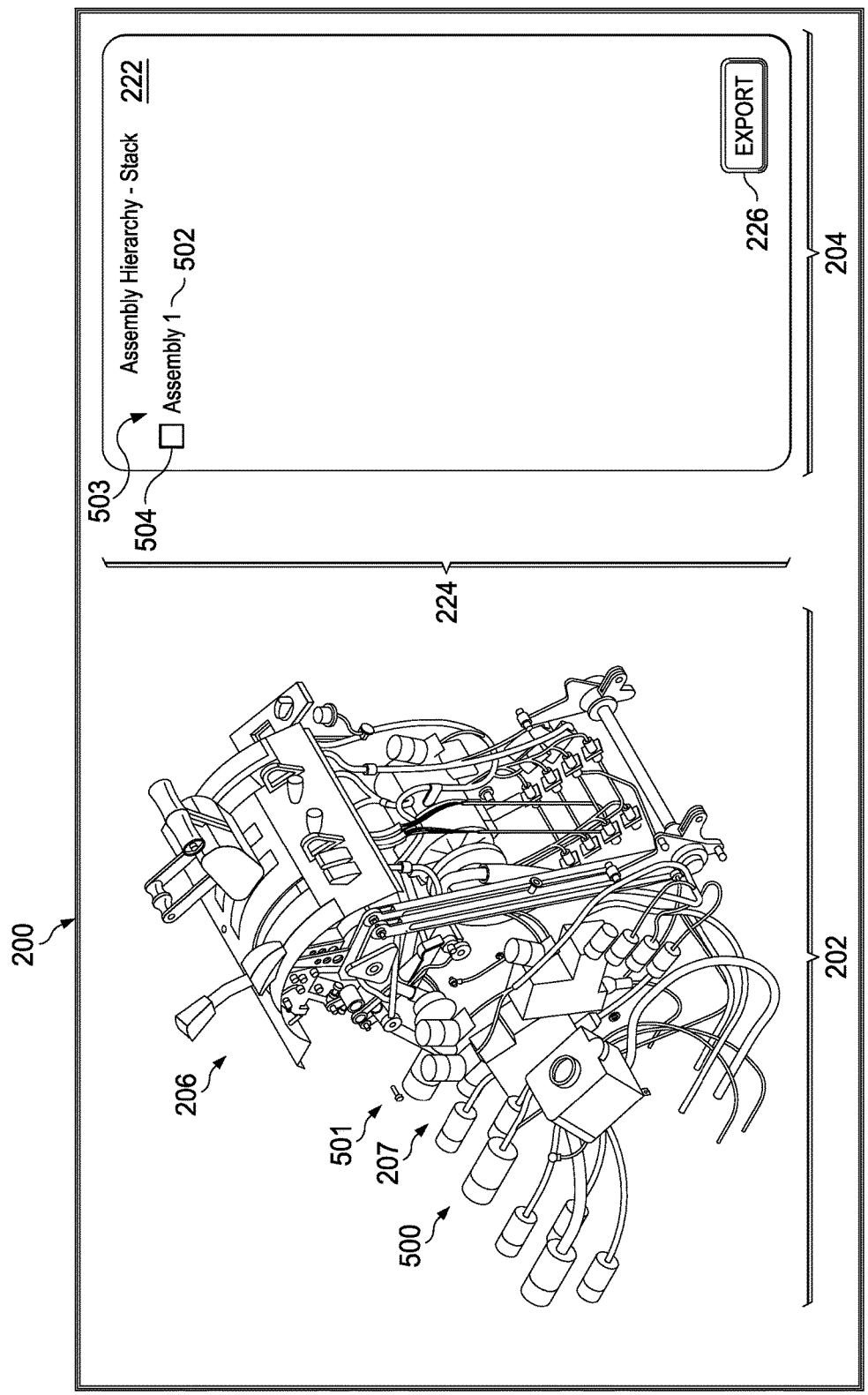
FIG. 5 is an illustration of an assembly model with the first item removed in accordance with an illustrative embodiment.

Turning now to FIG. 5, first item 208 from FIG. 4 has been removed from assembly model 206, thereby exposing portion 500 of assembly model 206. In this illustrative example, assembly model 206 is in new state 501, which is not yet a selected state for assembly model 206.

In response to the removal of first item 208, entry 502 has been added to area 224 within display box 222. In this manner, entry 502 is associated with new state 501. Entry 502 identifies first item 208 with an index number of "1," thereby indicting that first item 208 is the first in a sequence of removed items from assembly model 206. Entry 502 begins the building of assembly hierarchy 503, which may track the sequence of item removals from assembly model 206. Assembly hierarchy 503 is an example of one implementation for assembly hierarchy 114 in FIG. 1.

Primary checkbox 504 is displayed in association with entry 502. A selection of primary checkbox 504 causes a plurality of sub-entries to be displayed in display box 222. These sub-entries may identify the sub-items that make up first item 208.

Figure 6:
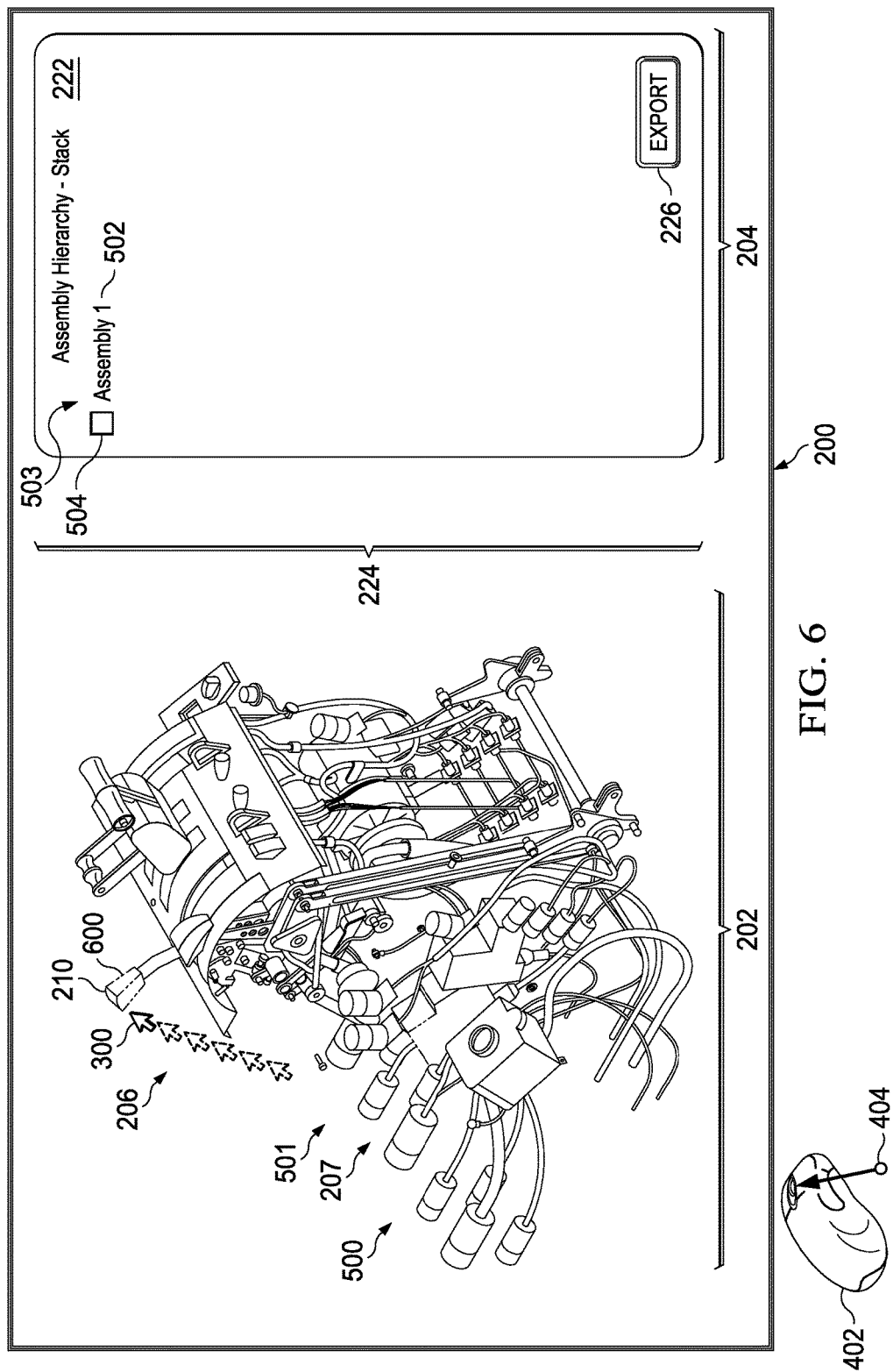
FIG. 6 is an illustration of a pointer moved over an item of a second assembly model in accordance with an illustrative embodiment.

In FIG. 6, pointer 300 may be moved over second item 210. In response to pointer 300 moving over second item 210, the display manager changes the solid view of second item 210 to transparent view 600. A click of scroll wheel 404, while pointer 300 is positioned over second item 210, may cause transparent view 600 to become a hidden view, thereby removing second item 210 from assembly model 206.

Figure 7:
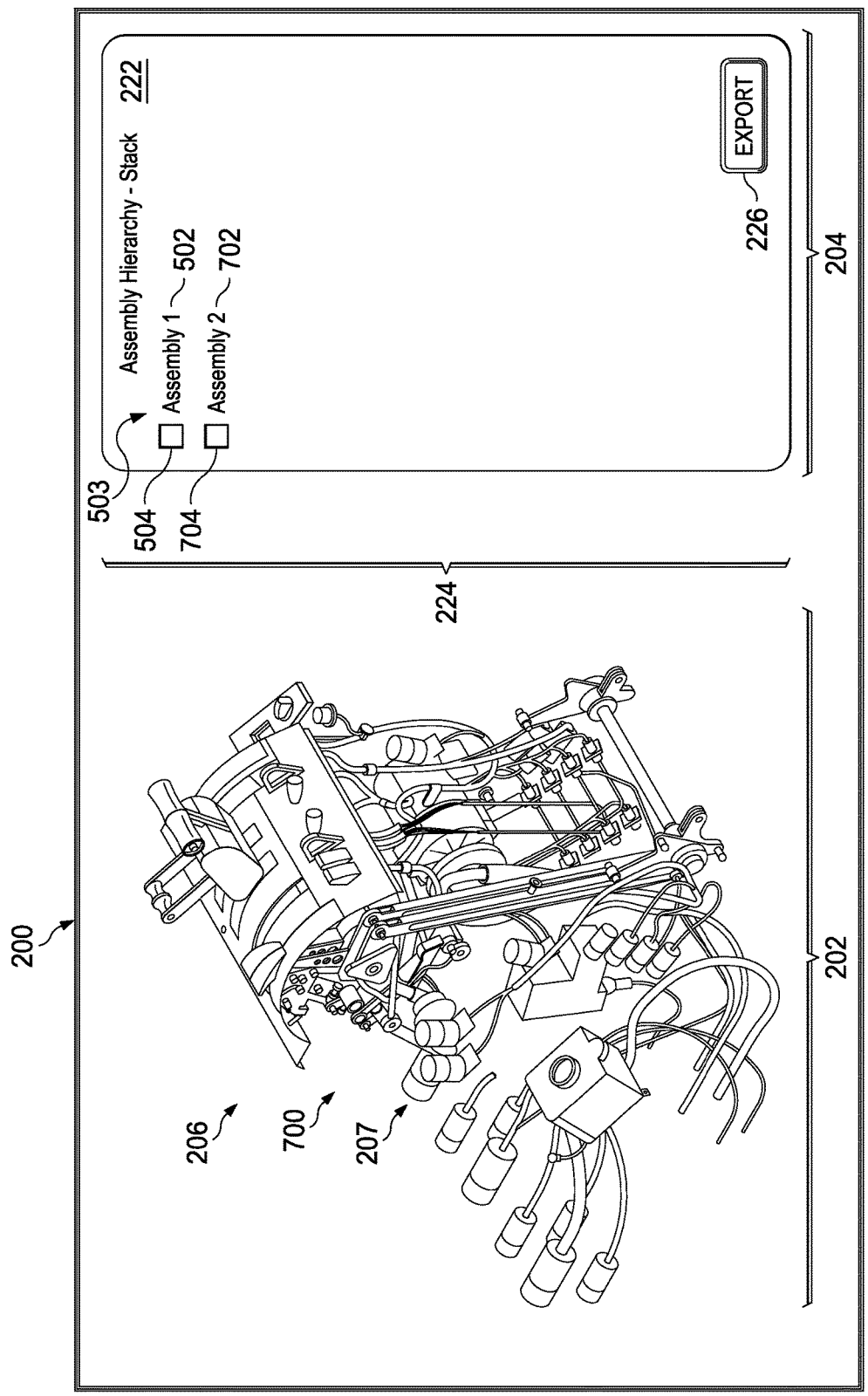
FIG. 7 is an illustration of an assembly model with the second item removed in accordance with an illustrative embodiment.

In FIG. 7, second item 210 from FIG. 6 has been removed from assembly model 206. Assembly model 206 has new state 700, which may not yet be a selected state for assembly model 206. Entry 702 has been added to assembly hierarchy 503 in response to the removal of second item 210. Primary checkbox 704 is displayed in association with entry 702.

Figure 8:
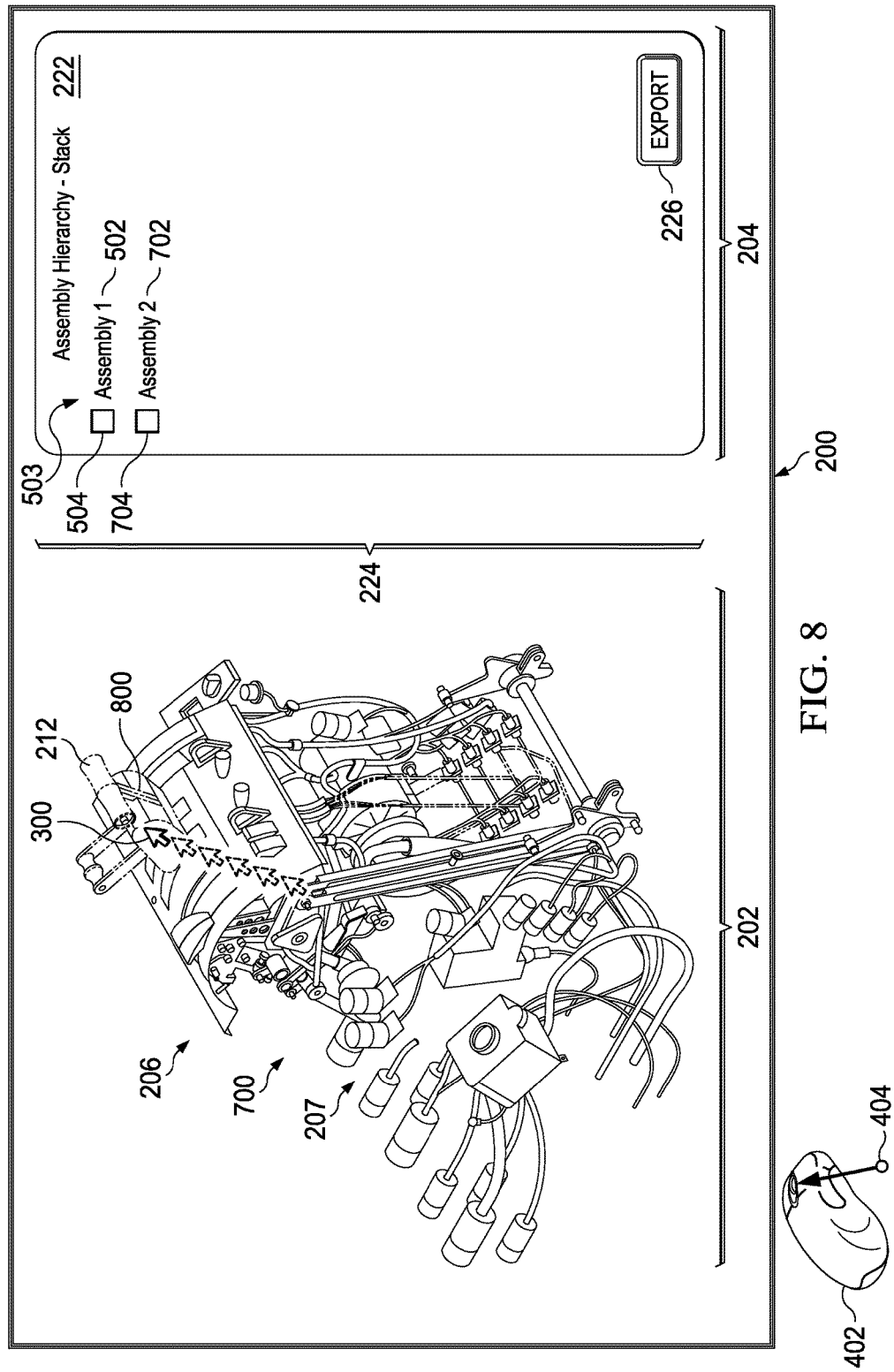
FIG. 8 is an illustration of a pointer moved over a third item of an assembly model in accordance with an illustrative embodiment.

Turning now to FIG. 8, pointer 300 may be moved over third item 212. In response to pointer 300 moving over third item 212, the display manager changes the solid view of third item 212 to transparent view 800. A click of scroll wheel 404, while pointer 300 is positioned over third item 212, may cause transparent view to become a hidden view of third item 212, thereby removing third item 212 from assembly model 206.

Figure 9:
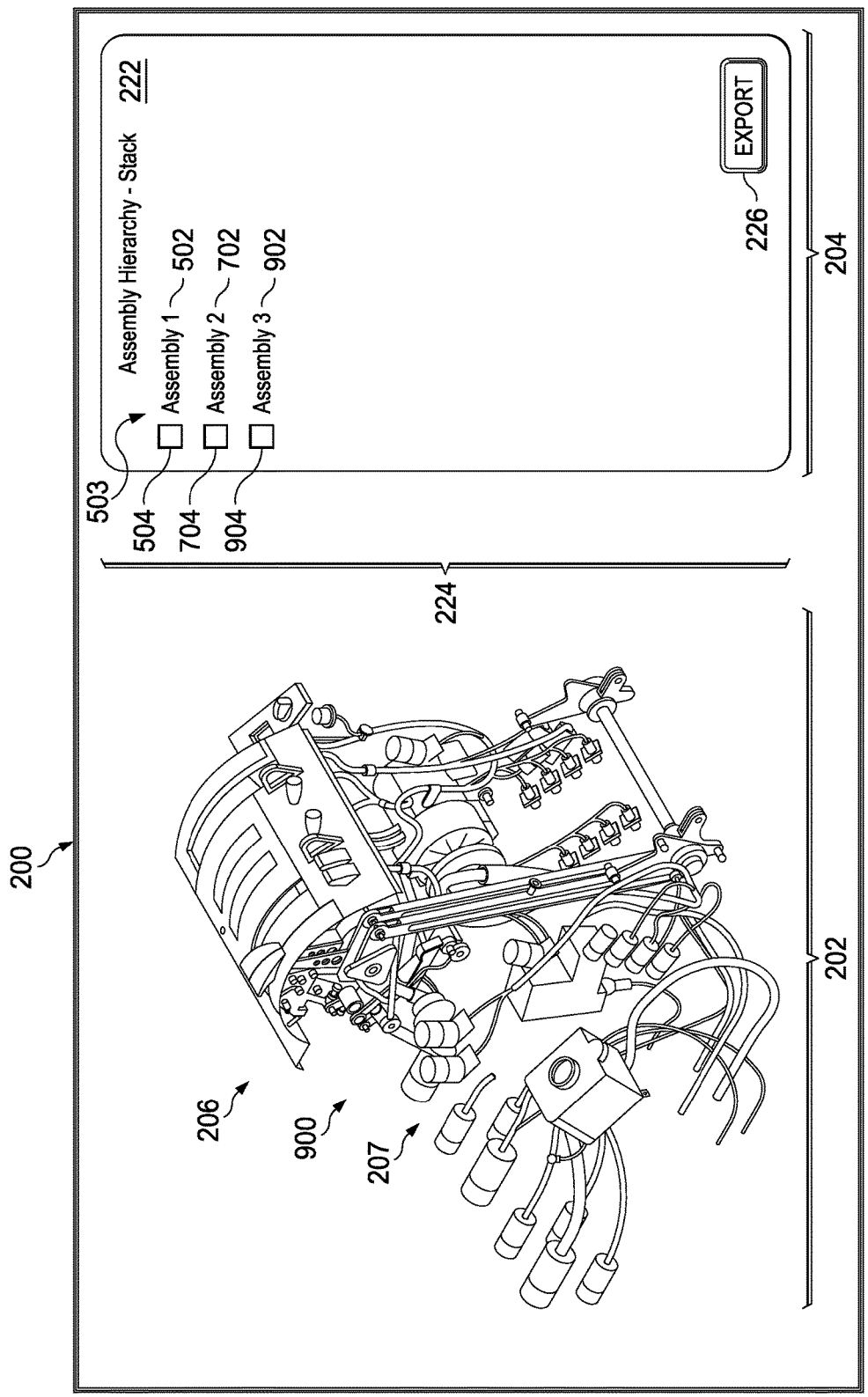
FIG. 9 is an illustration of an assembly model with the third item removed in accordance with an illustrative embodiment.

In FIG. 9, third item 212 from FIG. 8 has been removed from assembly model 206. Assembly model 206 has new state 900, which may not yet be a selected state for assembly model 206. Entry 902 has been added to assembly hierarchy 503 in response to the removal of third item 212. Primary checkbox 904 is displayed in association with entry 902.

Figure 10:
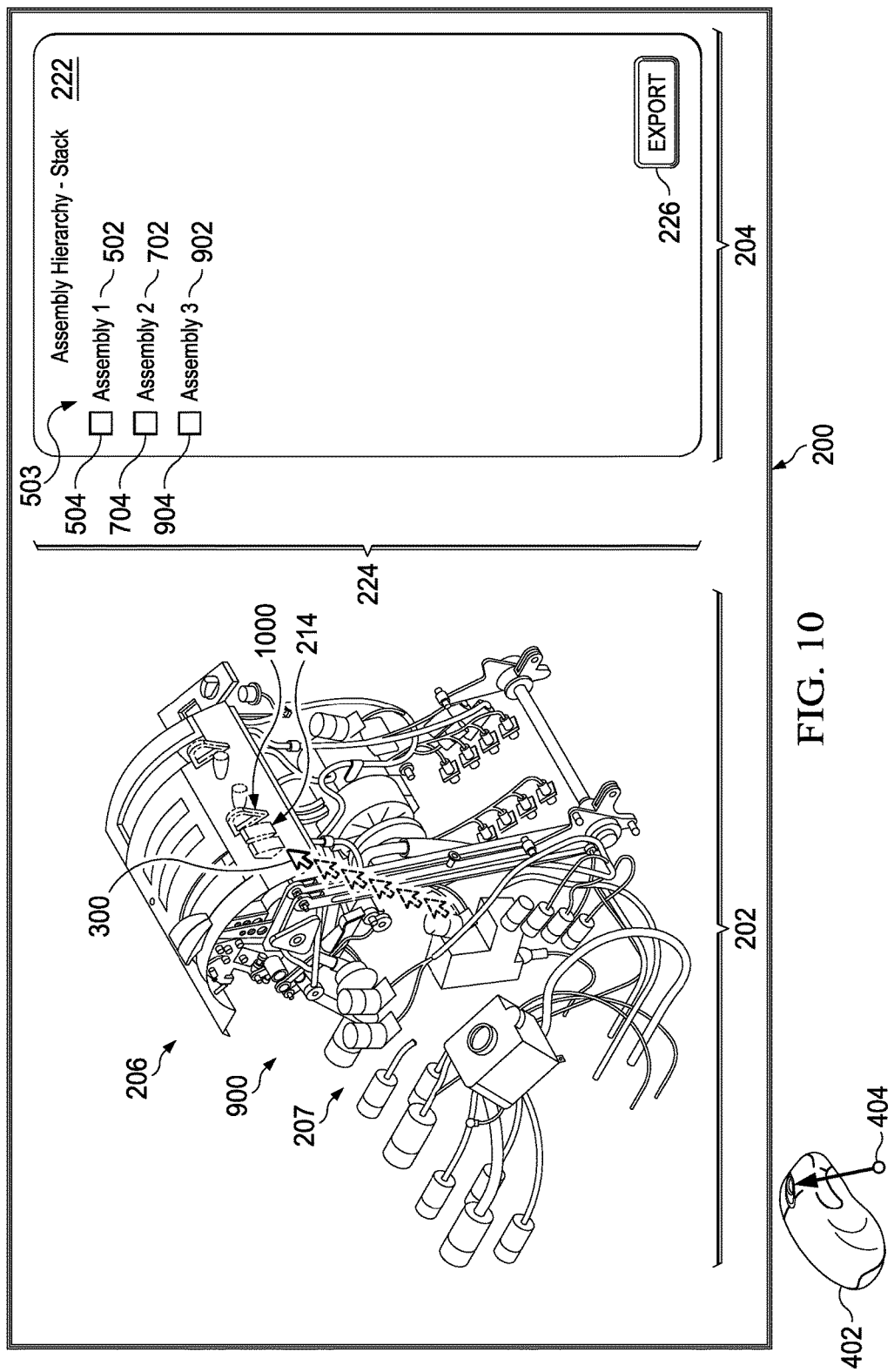
FIG. 10 is an illustration of a pointer moved over a fourth item of an assembly model in accordance with an illustrative embodiment.

Turning now to FIG. 10, pointer 300 is moved over fourth item 214 and the display manager changes the solid view of fourth item 214 to transparent view 1000. Transparent view 1000 of fourth item 214 may become a hidden view of fourth item 214 with a click of scroll wheel 404, while pointer 300 is positioned over fourth item 214.

Figure 11:
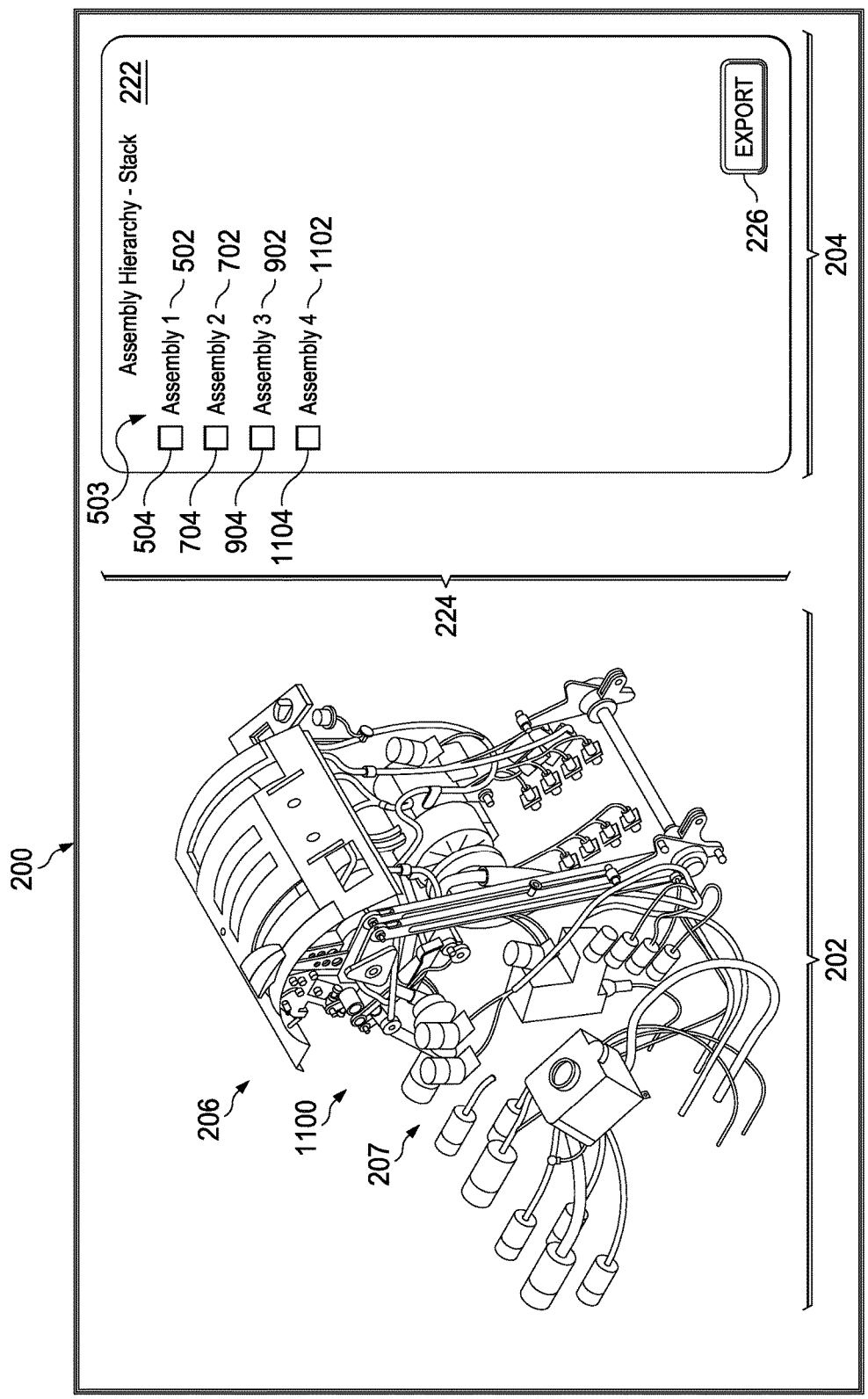
FIG. 11 is an illustration of an assembly model with the fourth item removed in accordance with an illustrative embodiment.

In FIG. 11, fourth item 214 from FIG. 10 has been removed from assembly model 206. Assembly model 206 has new state 1100, which may still not yet be a selected state for assembly model 206. Entry 1102 has been added to assembly hierarchy 503 in response to the removal of fourth item 214. Primary checkbox 1104 is displayed in association with entry 1102.

Figure 12:
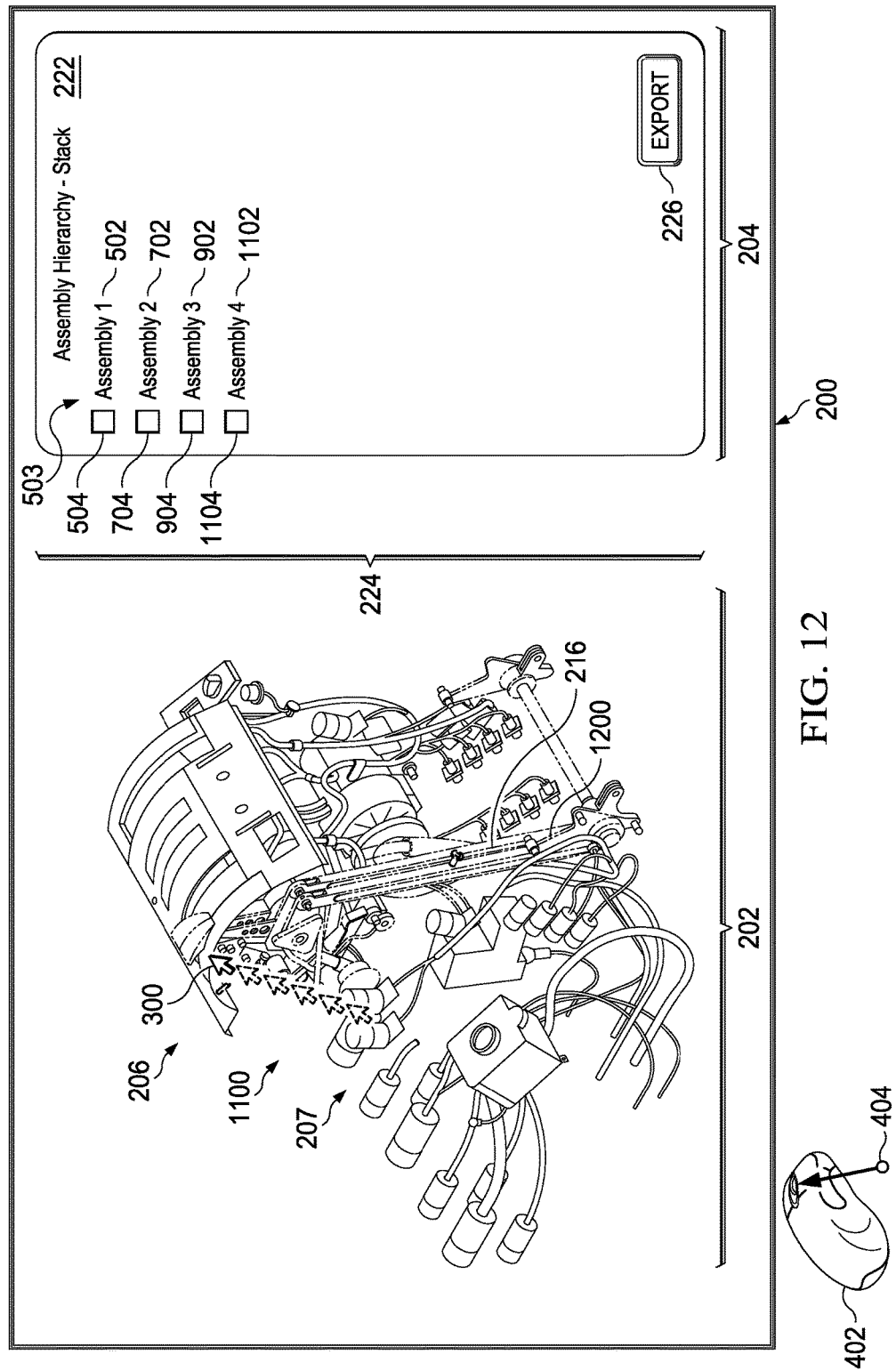
FIG. 12 is an illustration of a pointer moved over a fifth item of an assembly model in accordance with an illustrative embodiment.

Further, in FIG. 12, pointer 300 is moved over fifth item 216 and the display manager changes the solid view of fifth item 216 to transparent view 1200. Transparent view 1200 of fifth item 216 may be changed to a hidden view, thereby removing fifth item 216 from assembly model 206, with a click of scroll wheel 404, while pointer 300 is positioned over fifth item 216.

Figure 13:
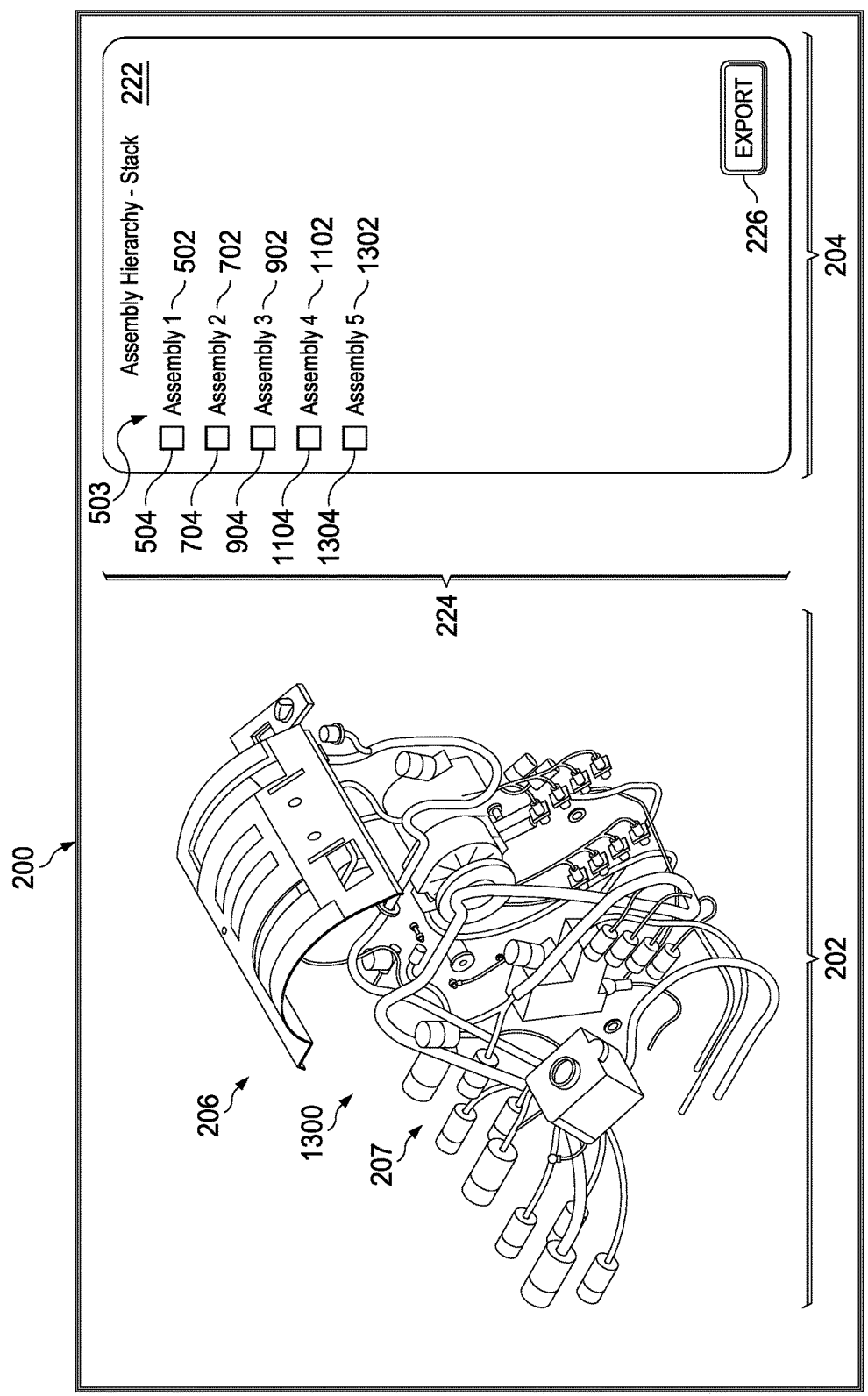
FIG. 13 is an illustration of an assembly model with the fifth item removed in accordance with an illustrative embodiment.

In FIG. 13, fifth item 216 from FIG. 12 has been removed from assembly model 206. Assembly model 206 has new state 1300, which may still not yet be a selected state for assembly model 206. Entry 1302 has been added to assembly hierarchy 503 in response to the removal of fifth item 216. Primary checkbox 1304 is displayed in association with entry 1302.

Figure 14:
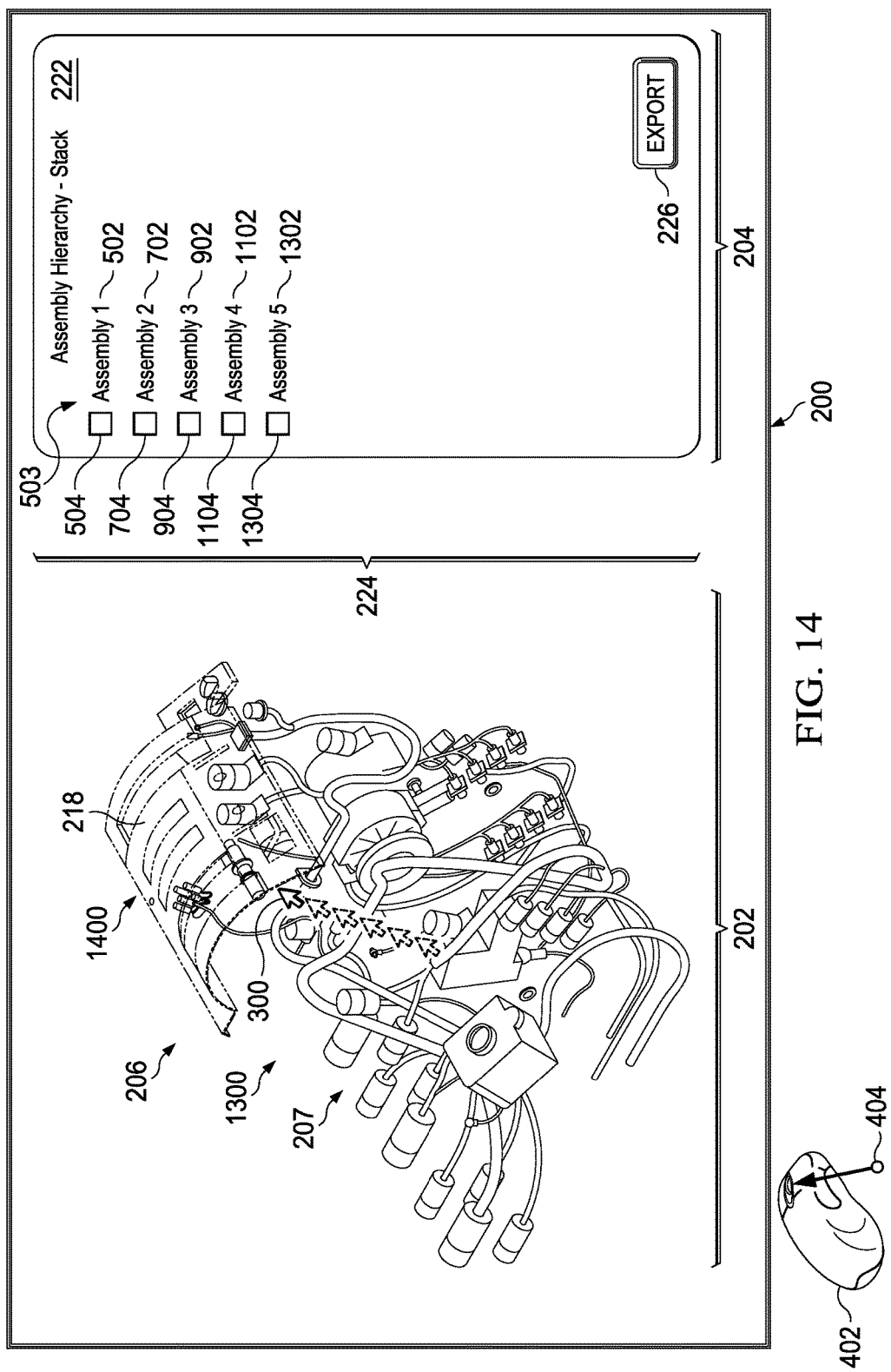
FIG. 14 is an illustration of a pointer moved over a sixth item of an assembly model in accordance with an illustrative embodiment.

With reference to FIG. 14, pointer 300 is moved over sixth item 218 and the display manager changes the solid view of sixth item 218 to transparent view 1400. Transparent view 1400 of sixth item 218 may be changed to a hidden view with a click of scroll wheel 404, while pointer 300 is positioned over sixth item 218. In this manner, sixth item 218 may be removed from assembly model 206.

Figure 15:
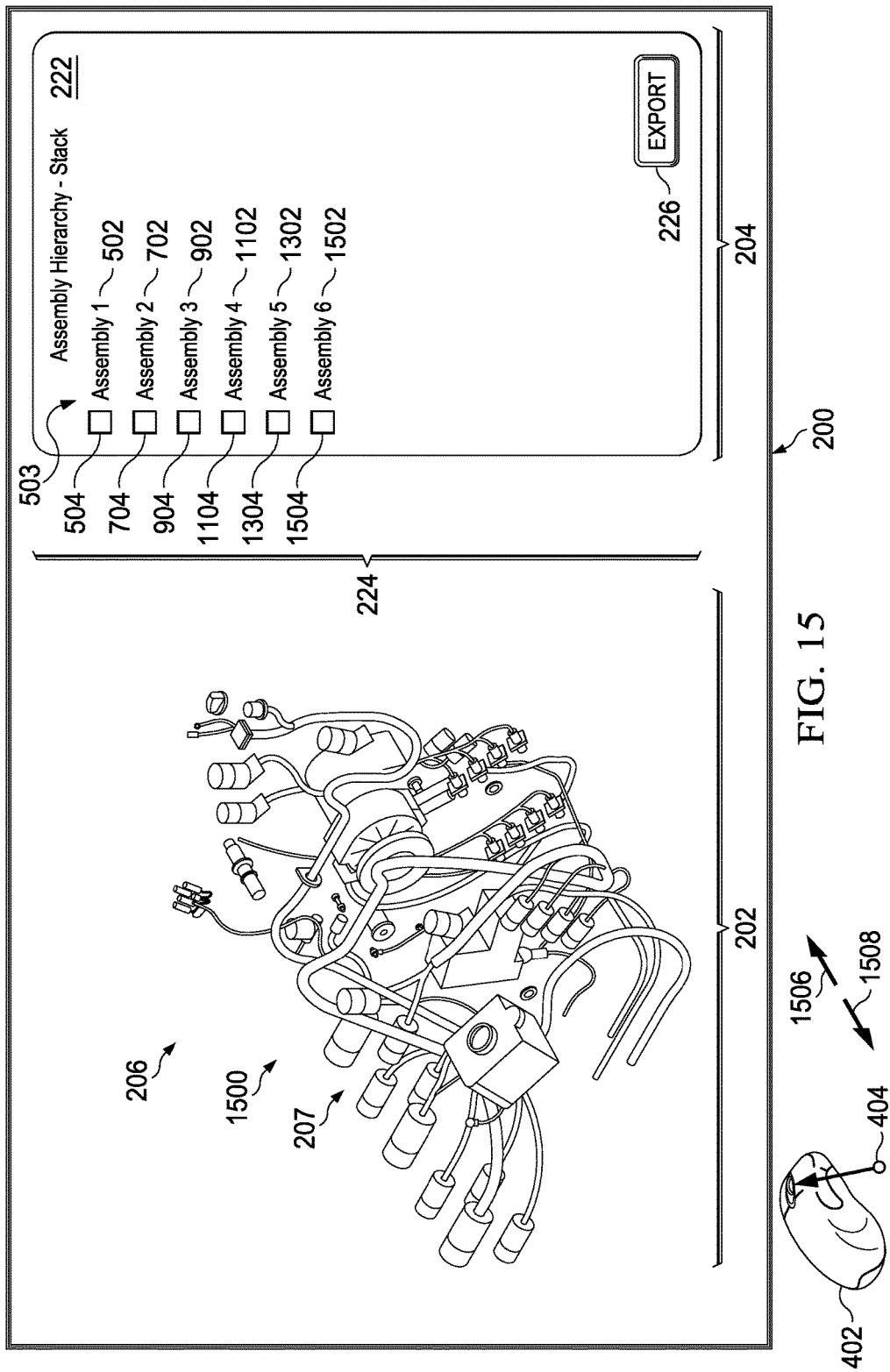
FIG. 15 is an illustration of an assembly model with the sixth item removed and in a selected state in accordance with an illustrative embodiment.

In FIG. 15, sixth item 218 from FIG. 14 has been removed from assembly model 206. Assembly model 206 is now displayed having selected state 1500. In selected state 1500, assembly model 206 represents a throttle assembly that has been partially disassemble.

Entry 1502 has been added to assembly hierarchy 503 in response to the removal of sixth item 218. Primary checkbox 1504 is displayed in association with entry 1502.

Scroll wheel 404 may be rolled in first direction 1506. The rolling of scroll wheel 404 in first direction 1506 may be an example of one implementation for first directional input 134 in FIG. 1. This rolling of scroll wheel 404 may enable traversal of a reverse sequence, which is the reverse of the sequence in which assembly hierarchy 503 was built. This reverse sequence may be traversed to return the displayed assembly model 206 from selected state 1500 back to initial state 221 depicted in FIG. 2.

For example, the visual presentation of assembly model 206 may traverse a reverse sequence that includes changing from selected state 1500, to new state 1300 in FIG. 13, to new state 1100 in FIG. 11, to new state 900 in FIG. 9, to new state 700 in FIG. 7, to new state 501 in FIG. 5, and back to initial state 221 in FIG. 2. In some cases, depending on the length of rolling of scroll wheel 404, traversal through this reverse sequence may stop at one of the states between initial state 221 and selected state 1500.

Further, rolling scroll wheel 404 in second direction 1508 may enable traversal through the sequence in which assembly hierarchy 503 was built. Rolling scroll wheel 404 in second direction 1508 may be an example of one implementation for second directional input 136 in FIG. 1.

In this manner, by manipulating scroll wheel 404 to provide directional user input, a user may be able to visualize the graphical representation of the disassembly of the throttle assembly represented by assembly model 206 into the state or configuration for the throttle assembly needed in order to perform the repair operation. Further, user may also be able to visualize the graphical representation of the reassembly of the throttle assembly represented by assembly model 206.

This type of visualization may reduce the number of errors that may be made during disassembly and reassembly of the throttle assembly. Further, the display of assembly hierarchy 503 within second display area 204 in correspondence with assembly model 206 in first display area 202 may visually present the sequence to the user.

As described in FIGS. 3-15, detailed information about the individual components of the throttle assembly may not be needed to build assembly hierarchy 503 and create the sequence needed for disassembly and the reverse sequence needed for reassembly.

Figure 16:
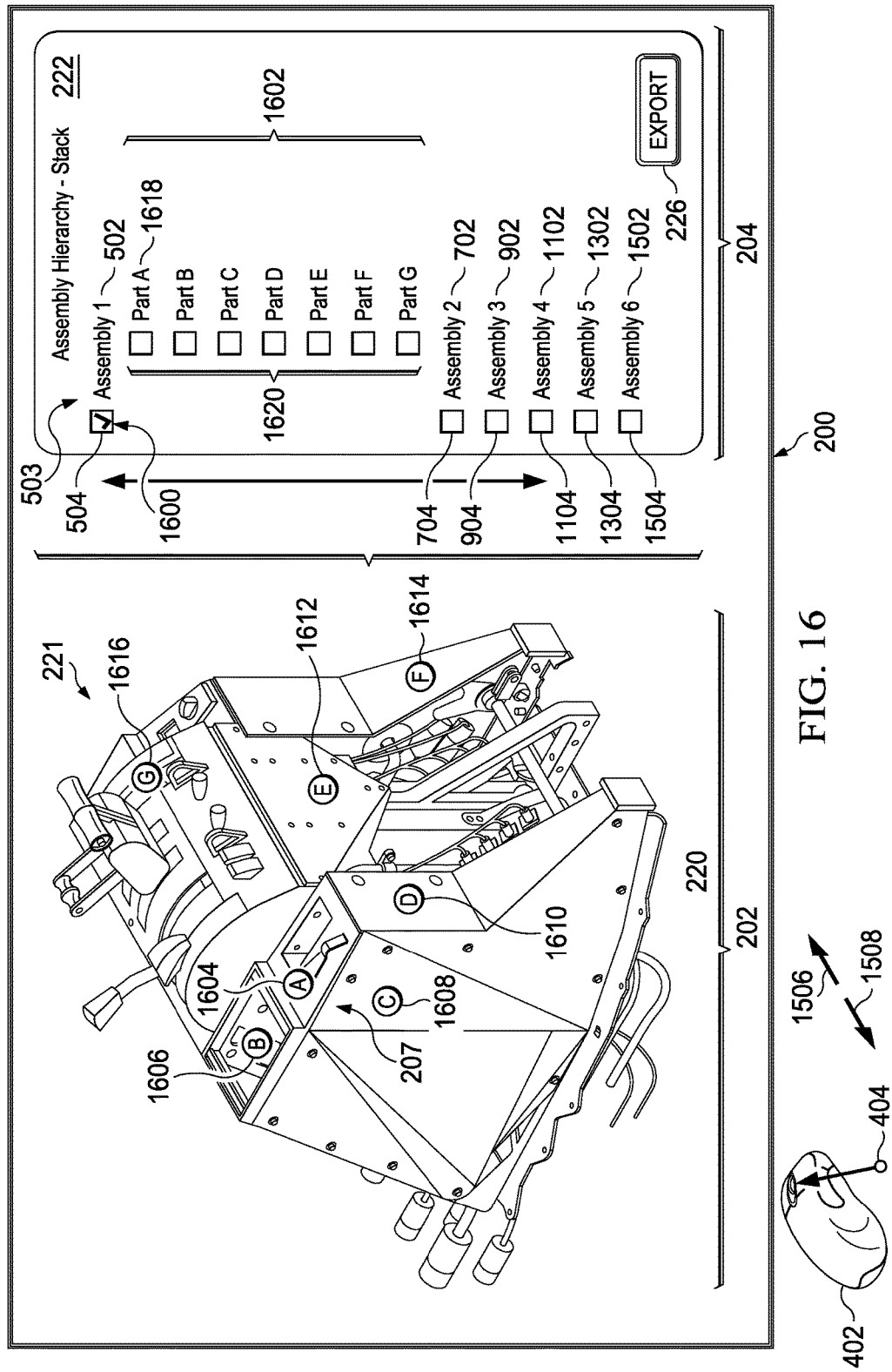
FIG. 16 is an illustration of a display of a plurality of sub-entries in accordance with an illustrative embodiment.

With reference now to FIG. 16, an illustration of a display of a plurality of sub-entries is depicted in accordance with an illustrative embodiment. In this illustrative example, the display manager has changed selected state 1500 of assembly model 206 in FIG. 15 back to initial state 221.

As depicted, selection 1600 of primary checkbox 504 associated with entry 502 has been made. In response to selection 1600, the display manager displays plurality of sub-entries 1602 in association with entry 502. Each of plurality of sub-entries 1602 identifies a corresponding sub-item that makes up first item 208. For example, first item 208 may include sub-item 1604, sub-item 1606, sub-item 1608, sub-item 1610, sub-item 1612, sub-item 1614, and sub-item 1616.

In this illustrative example, sub-entry 1618 of plurality of sub-entries 1602 identifies sub-item 1604. Further, plurality of secondary checkboxes 1620 are displayed in association with plurality of sub-entries 1602.

A selection of a primary checkbox, such as primary checkbox 504, indicates that may be not all of the sub-items that make up the item identified by the entry that corresponds to that primary checkbox are to be hidden when the corresponding state of assembly model 206 is displayed. For example, a selection of primary checkbox 504, which is associated with entry 502, indicates that may be not all of the sub-items represented by plurality of sub-entries 1602 are to be hidden when new state 501 of assembly model 206 corresponding to entry 502 is displayed.

A selection of one of plurality of secondary checkboxes 1620 indicates that the corresponding sub-item identified by the corresponding sub-entry of plurality of sub-entries is to be removed from assembly model 206 when new state 501 of assembly model 206 from FIG. 5 corresponding to entry 502 is displayed. Any number of selections of plurality of secondary checkboxes 1620 may be made. The display manager may track the sequence of these selections.

Figure 17:
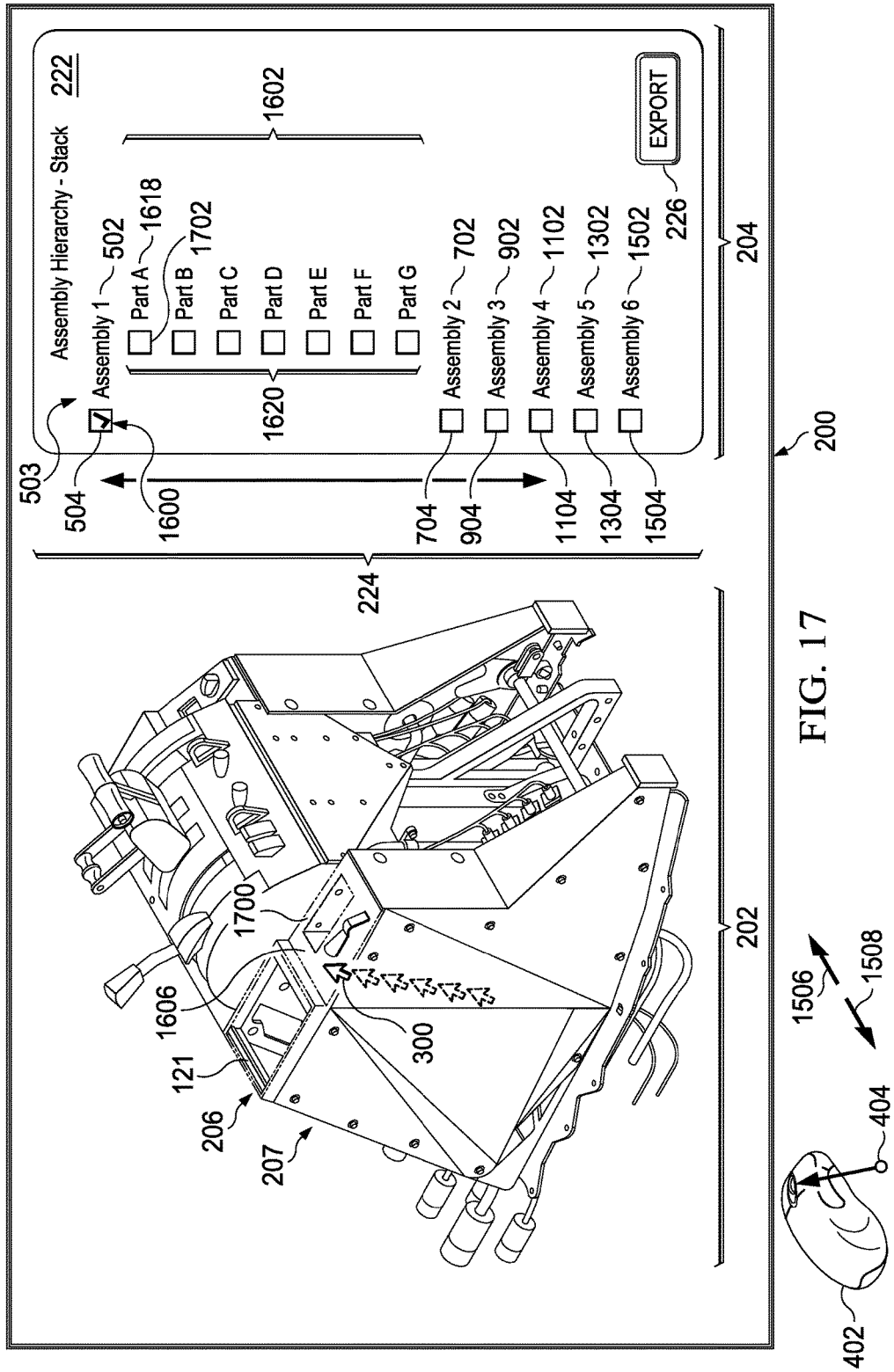
FIG. 17 is an illustration of a changing of a display state for a sub-item of a first item of an assembly model in accordance with an illustrative embodiment.

With reference now to FIG. 17, an illustration of a changing of a display state for a sub-item of first item 208 of assembly model 206 from FIG. 16 is depicted in accordance with an illustrative embodiment. In this illustrative example, pointer 300 has been moved over sub-item 1604. In response to pointer 300 moving over sub-item 1604, the solid view of sub-item 1604 is changed to transparent view 1700.

A click of scroll wheel 404, while pointer 300 is over sub-item 1604 may result in a selection of secondary check box 1702 associated with sub-entry 1618. This selection may associate sub-item 1604 only with new state 501 from FIG. 5 corresponding to entry 502 as opposed to all of the sub-items of first item 208 with new state 501. In other words, new state 501 from FIG. 5 may be considered modified.

This modified new state (not shown) may take the place of new state 501 in the overall sequence associated with assembly hierarchy 503. Rolling scroll wheel 404 in second direction 1508 may result in sub-item 1604 being removed from assembly model 206. The process described above may be repeated for one or more other sub-items represented by the remaining sub-entries of plurality of sub-entries 1602 until new state 501 from FIG. 5 has been modified as desired.

Figure 18:
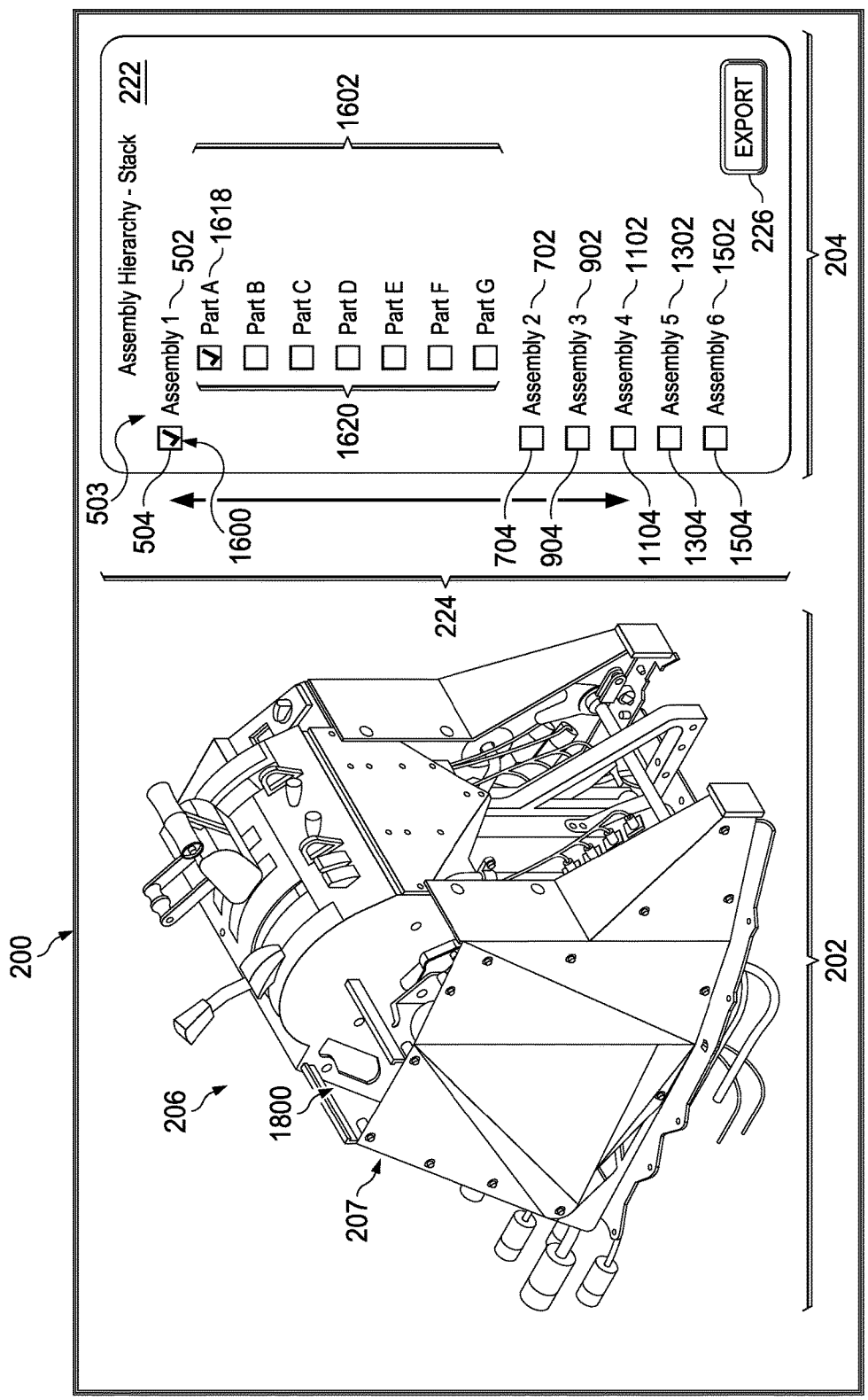
FIG. 18 is an illustration of a removal of a sub-item from an assembly model in accordance with an illustrative embodiment.

With reference now to FIG. 18, an illustration of a removal of a sub-item from assembly model 206 from FIG. 17 is depicted in accordance with an illustrative embodiment. In this illustrative example, sub-item 1604 from FIG. 17 has been removed from assembly model 206. Assembly model 206 may now have modified new state 1800.

The illustrations of graphical user interface 200 in FIGS. 2-18 are not meant to imply physical or architectural limitations to the manner in which an illustrative embodiment may be implemented. Other elements in addition to or in place of the ones illustrated may be used. Some elements may be optional. The different elements shown in FIGS. 2-18 may be illustrative examples of how elements shown in block form in FIG. 1 can be implemented.

Figure 19:
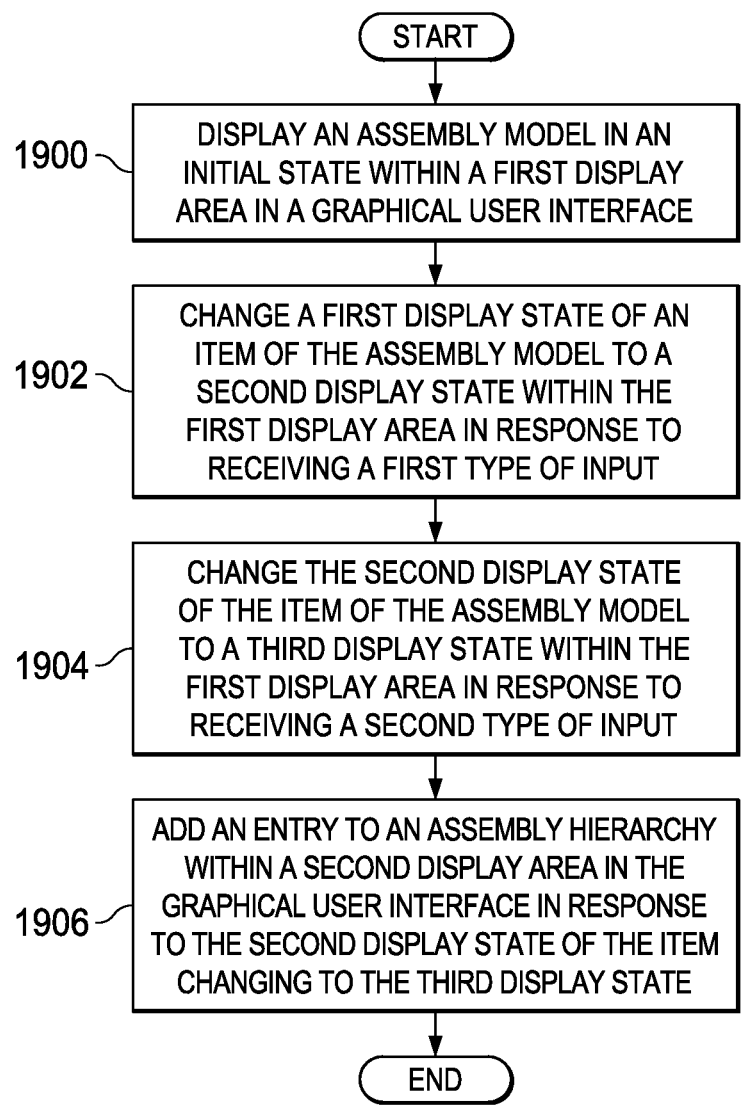
FIG. 19 is an illustration of a process for managing a display of an assembly model in the form of a flowchart in accordance with an illustrative embodiment.

With reference now to FIG. 19, an illustration of a process for managing a display of an assembly model is depicted in the form of a flowchart in accordance with an illustrative embodiment. The process illustrated in FIG. 19 may be implemented using display system 100 in FIG. 1. In particular, the process may be implemented using display manager 101 in FIG. 1.

The process may begin by displaying an assembly model in an initial state within a first display area in a graphical user interface (operation 1900). Next, a first display state of an item of the assembly model may be changed to a second display state within the first display area in response to receiving a first type of input (operation 1902).

The second display state of the item of the assembly model may then be changed to a third display state within the first display area in response to receiving a second type of input (operation 1904). An entry is added to an assembly hierarchy within a second display area in the graphical user interface in response to the second display state of the item changing to the third display state (operation 1906), with the process terminating thereafter.

Figure 20:
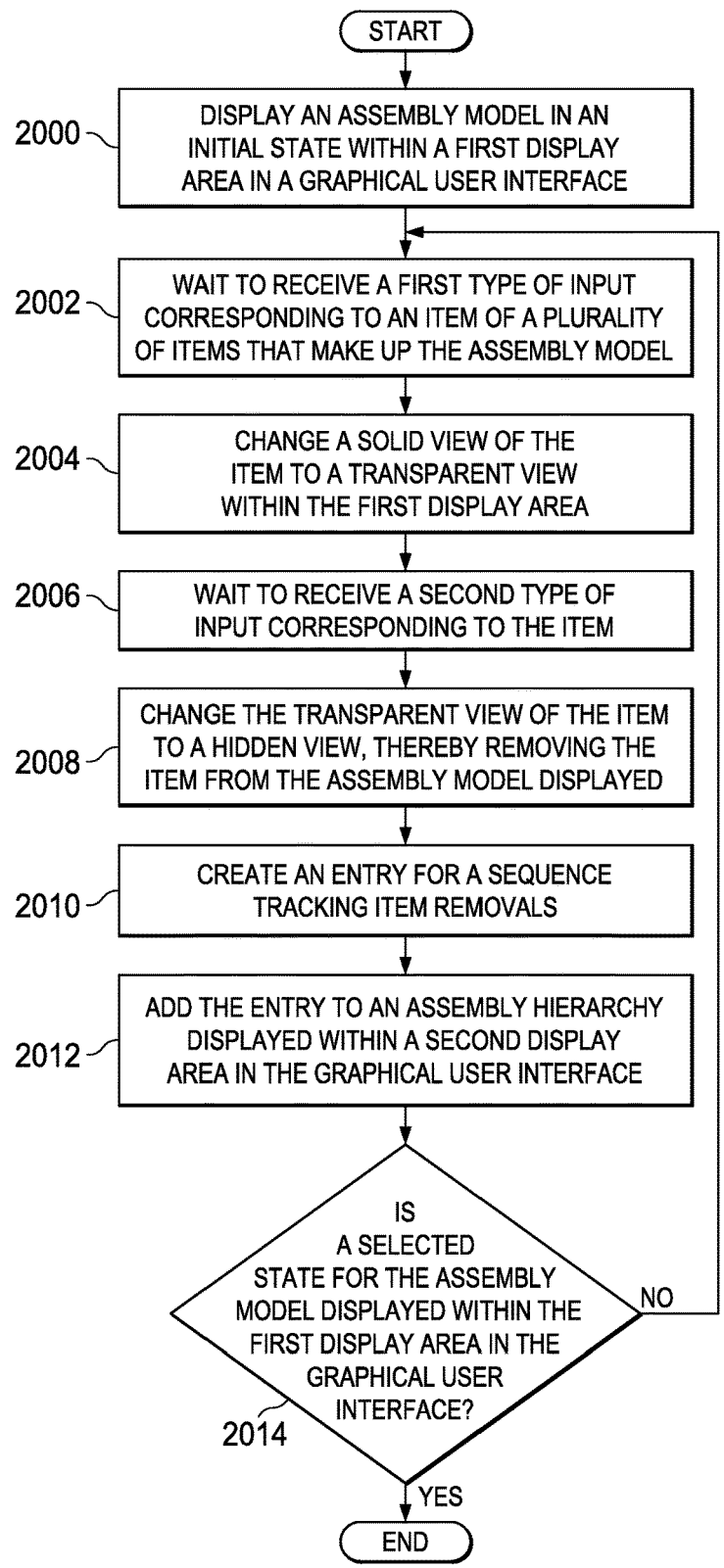
FIG. 20 is an illustration of a process for managing a display of an assembly model in the form of a flowchart in accordance with an illustrative embodiment.

With reference now to FIG. 20, an illustration of a process for managing a display of an assembly model is depicted in the form of a flowchart in accordance with an illustrative embodiment. The process illustrated in FIG. 20 may be implemented using display system 100 in FIG. 1. In particular, the process may be implemented using display manager 101 in FIG. 1.

The process may begin by displaying an assembly model in an initial state within a first display area in a graphical user interface (operation 2000). The process may then wait to receive a first type of input corresponding to an item of a plurality of items that make up the assembly model (operation 2002). In operation 2002, this first type of input may be a first type of selection input that selects the item or designates the item in some manner.

In response to receiving the first type of input, a solid view of the item may be changed to a transparent view within the first display area (operation 2004). In this manner, the item may be readily distinguishable from a rest of the assembly model. Further, any portion of the assembly model behind or under the item may become visible.

Thereafter, the process waits to receive a second type of input corresponding to the item (operation 2006). This second type of input may be a second type of selection input that selects the item or designates the item in some manner.

In response to receiving the second type of input, the transparent view of the item is changed to a hidden view, thereby removing the item from the assembly model displayed (operation 2008). An entry is created for a sequence tracking item removals (operation 2010). The entry is added to an assembly hierarchy displayed within a second display area in the graphical user interface (operation 2012).

A determination may be made as to whether a selected state for the assembly model is displayed within the first display area of the graphical user interface (operation 2014). In response to a determination that a selected state for the assembly model is not displayed, the process returns to operation 2002 as described above. Otherwise, the process terminates. The final assembly hierarchy tracks the sequence of the removal of the items from the assembly model. This sequence may represent a disassembly sequence for a physical or theoretical assembly that is represented by the assembly model. The reverse of this sequence may represent a reassembly sequence for the physical or theoretical assembly that is represented by the assembly model. This sequence and the reverse sequence may be stored for future use.

With reference again to operation 2014, this determination may be made in different ways. In one illustrative example, the determination may be made based on user input. As one illustrative example, in some cases, the receiving of a first type of input selecting another item of the assembly model may constitute a simultaneous performance of operation 2014 and operation 2002 described above.

In another illustrative example, user input selecting a particular graphical control in graphical user interface may be considered a termination of the assembly hierarchy building process. A detection of this user selection may be used to make the determination described in operation 2014.

Figure 21:
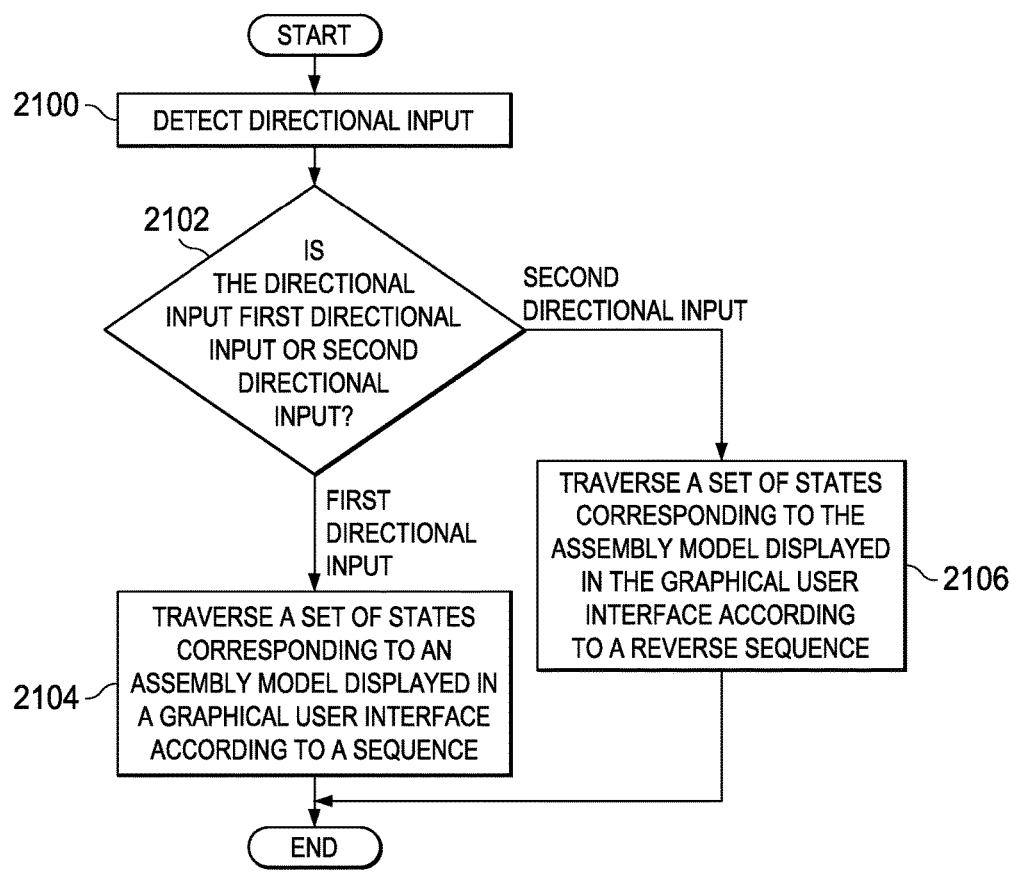
FIG. 21 is an illustration of a process for traversing a sequence and a reverse sequence corresponding to an assembly hierarchy in the form of a flowchart in accordance with an illustrative embodiment.

With reference now to FIG. 21, an illustration of a process for traversing a sequence and a reverse sequence corresponding to an assembly hierarchy is depicted in the form of a flowchart in accordance with an illustrative embodiment. The process illustrated in FIG. 21 may be implemented using display system 100 in FIG. 1. In particular, the process may be implemented using display manager 101 in FIG. 1.

The process may begin by detecting directional input (operation 2100). A determination may then be made as to whether the directional input is first directional input or second directional input (operation 2102). If the directional input is first directional input, a set of states corresponding to an assembly model displayed in a graphical user interface are traversed according to a sequence (operation 2104), with the process terminating thereafter. The sequence described in operation 2104 may represent a disassembly sequence.

As used herein, a "set of states" may be zero, one, two, or some other number of states. In this manner, in operation 2104, zero, one, two, five, or some other number of states may be traversed. The number of states traversed, if any, may depend on the current state of the assembly model, the total number of states captured by the sequence, and the first directional input. For example, if the first directional input is a rolling of a scroll wheel of a mouse in a first direction, then the number of states traversed may depend on the current state of the assembly model, the total number of states captured by the sequence, and the number of degrees of revolution of the scroll wheel.

With reference again to operation 2102, if the directional input is second directional input, a set of states corresponding to the assembly model displayed in the graphical user interface are traversed according to a reverse sequence (operation 2106), with the process terminating thereafter. The reverse sequence described in operation 2106 may be the reverse of the sequence described in operation 2014 and may represent a reassembly sequence. The number of states traversed, if any, may depend on the current state of the assembly model, the total number of states captured by the reverse sequence, and the second directional input.

The process described in FIG. 21 may be repeated each time directional input is detected. In some cases, this process may only be performed after an assembly hierarchy has been fully created. In other illustrative examples, this process may be performed at any time during the building of an assembly hierarchy. For example, this process may be performed at any time during the process described in FIG. 20 above. In this manner, the sequence and reverse sequence referred to in FIG. 21 may be dynamic in that these sequences may evolve over time.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 22:
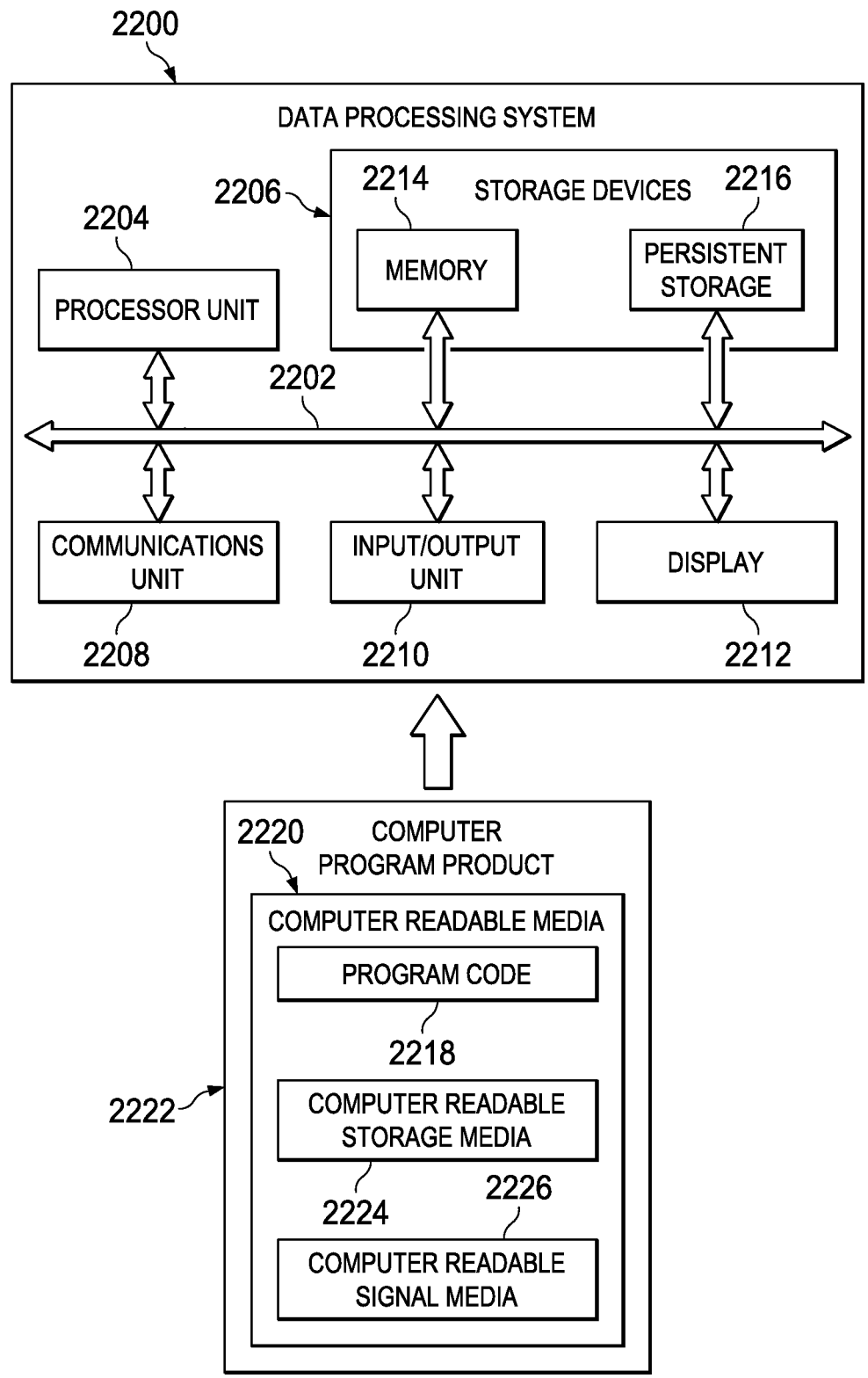
FIG. 22 is an illustration of a data processing system in the form of a block diagram in accordance with an illustrative embodiment.

Turning now to FIG. 22, an illustration of a data processing system is depicted in the form of a block diagram in accordance with an illustrative embodiment. Data processing system 2200 may be used to implement computer system 104 in FIG. 1. As depicted, data processing system 2200 includes communications framework 2202, which provides communications between processor unit 2204, storage devices 2206, communications unit 2208, input/output unit 2210, and display 2212. In some cases, communications framework 2202 may be implemented as a bus system.

Processor unit 2204 is configured to execute instructions for software to perform a number of operations. Processor unit 2204 may comprise a number of processors, a multiprocessor core, and/or some other type of processor, depending on the implementation. In some cases, processor unit 2204 may take the form of a hardware unit, such as a circuit system, an application specific integrated circuit (ASIC), a programmable logic device, or some other suitable type of hardware unit.

Instructions for the operating system, applications, and/or programs run by processor unit 2204 may be located in storage devices 2206. Storage devices 2206 may be in communication with processor unit 2204 through communications framework 2202. As used herein, a storage device, also referred to as a computer readable storage device, is any piece of hardware capable of storing information on a temporary and/or permanent basis. This information may include, but is not limited to, data, program code, and/or other information.

Memory 2214 and persistent storage 2216 are examples of storage devices 2206. Memory 2214 may take the form of, for example, a random access memory or some type of volatile or non-volatile storage device. Persistent storage 2216 may comprise any number of components or devices. For example, persistent storage 2216 may comprise a hard drive, a flash memory, a rewritable optical disk, a rewritable magnetic tape, or some combination of the above. The media used by persistent storage 2216 may or may not be removable.

Communications unit 2208 allows data processing system 2200 to communicate with other data processing systems and/or devices. Communications unit 2208 may provide communications using physical and/or wireless communications links.

Input/output unit 2210 allows input to be received from and output to be sent to other devices connected to data processing system 2200. For example, input/output unit 2210 may allow user input to be received through a keyboard, a mouse, and/or some other type of input device. As another example, input/output unit 2210 may allow output to be sent to a printer connected to data processing system 2200.

Display 2212 is configured to display information to a user. Display 2212 may comprise, for example, without limitation, a monitor, a touch screen, a laser display, a holographic display, a virtual display device, and/or some other type of display device.

In this illustrative example, the processes of the different illustrative embodiments may be performed by processor unit 2204 using computer-implemented instructions. These instructions may be referred to as program code, computer usable program code, or computer readable program code and may be read and executed by one or more processors in processor unit 2204.

In these examples, program code 2218 is located in a functional form on computer readable media 2220, which is selectively removable, and may be loaded onto or transferred to data processing system 2200 for execution by processor unit 2204. Program code 2218 and computer readable media 2220 together form computer program product 2222. In this illustrative example, computer readable media 2220 may be computer readable storage media 2224 or computer readable signal media 2226.

Computer readable storage media 2224 is a physical or tangible storage device used to store program code 2218 rather than a medium that propagates or transmits program code 2218. Computer readable storage media 2224 may be, for example, without limitation, an optical or magnetic disk or a persistent storage device that is connected to data processing system 2200.

Alternatively, program code 2218 may be transferred to data processing system 2200 using computer readable signal media 2226. Computer readable signal media 2226 may be, for example, a propagated data signal containing program code 2218. This data signal may be an electromagnetic signal, an optical signal, and/or some other type of signal that can be transmitted over physical and/or wireless communications links.

The illustration of data processing system 2200 in FIG. 22 is not meant to provide architectural limitations to the manner in which the illustrative embodiments may be implemented. The different illustrative embodiments may be implemented in a data processing system that includes components in addition to or in place of those illustrated for data processing system 2200. Further, components shown in FIG. 22 may be varied from the illustrative examples shown.

Figure 23:
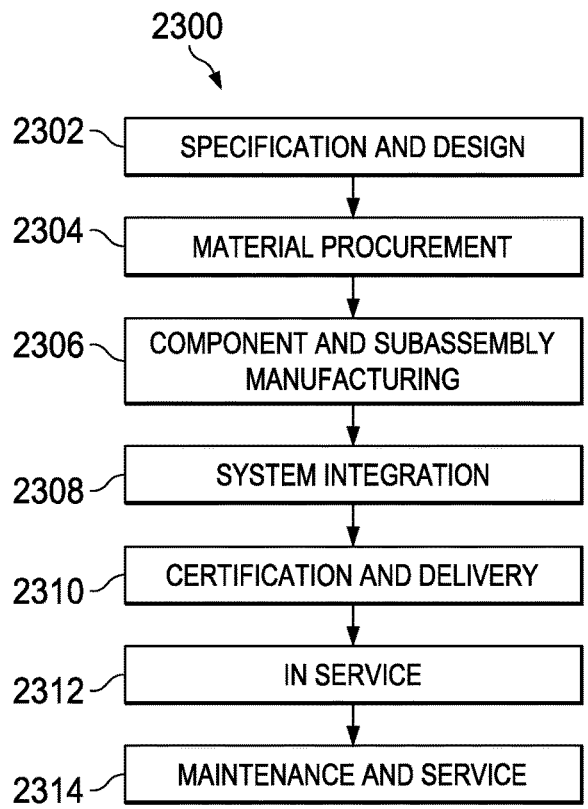
FIG. 23 is an illustration of aircraft manufacturing and service method in the form of a block diagram in accordance with an illustrative embodiment.
Figure 24:
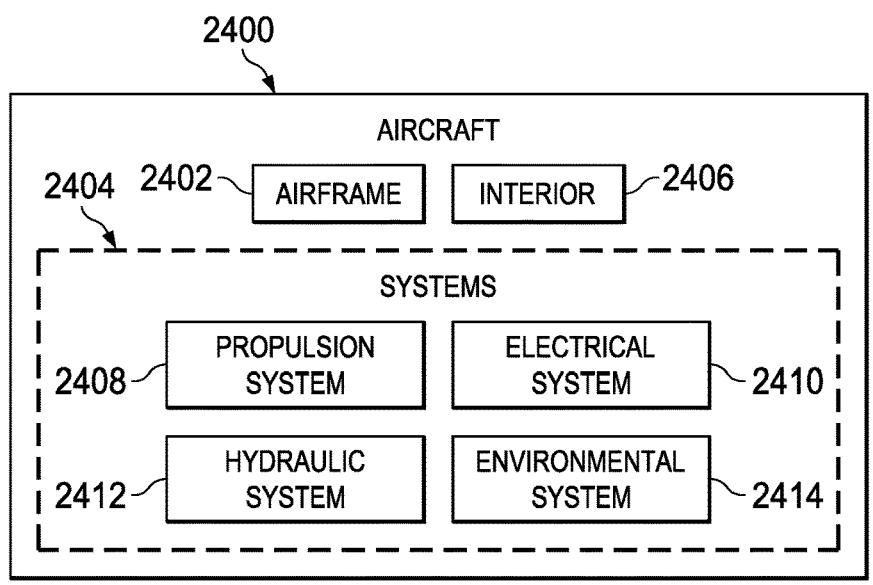
FIG. 24 is an illustration of an aircraft in the form of a block diagram in which an illustrative embodiment may be implemented.

The illustrative embodiments of the disclosure may be described in the context of aircraft manufacturing and service method 2300 as shown in FIG. 23 and aircraft 2400 as shown in FIG. 24. Turning first to FIG. 23, an illustration of an aircraft manufacturing and service method is depicted in the form of a block diagram in accordance with an illustrative embodiment. During pre-production, aircraft manufacturing and service method 2300 may include specification and design 2302 of aircraft 2400 in FIG. 24 and material procurement 2304.

During production, component and subassembly manufacturing 2306 and system integration 2308 of aircraft 2400 in FIG. 24 takes place. Thereafter, aircraft 2400 in FIG. 24 may go through certification and delivery 2310 in order to be placed in service 2312. While in service 2312 by a customer, aircraft 2400 in FIG. 24 is scheduled for routine maintenance and service 2314, which may include modification, reconfiguration, refurbishment, and other maintenance or service.

Each of the processes of aircraft manufacturing and service method 2300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 24, an illustration of an aircraft is depicted in the form of a block diagram in which an illustrative embodiment may be implemented. In this example, aircraft 2400 is produced by aircraft manufacturing and service method 2300 in FIG. 23 and may include airframe 2402 with plurality of systems 2404 and interior 2406. Examples of systems 2404 include one or more of propulsion system 2408, electrical system 2410, hydraulic system 2412, and environmental system 2414. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 2300 in FIG. 23. In particular, display system 100 from FIG. 1 may be used by one or more persons during any one of the stages of aircraft manufacturing and service method 2300 to visualize a disassembly sequence, a reassembly sequence, or both while performing work on aircraft 2400. For example, without limitation, display system 100 from FIG. 1 may be used to enable a user to create and visualize a disassembly sequence, a reassembly sequence, or both during at least one of component and subassembly manufacturing 2306, system integration 2308, routine maintenance and service 2314, or some other stage of aircraft manufacturing and service method 2300.

Display system 100 in FIG. 1 may enable, for example, a mechanic or technician who is performing a repair or maintenance operation for a particular assembly of aircraft 2400 to easily and quickly visualize a sequence for disassembling this particular assembly and then a reverse sequence for reassembling the particular assembly. This type of visualization may be provided to the mechanic or technician by display system 100 without requiring that the mechanic or technician need to know detailed information about the particular components that make up the assembly.

In one illustrative example, components or subassemblies produced in component and subassembly manufacturing 2306 in FIG. 23 may be fabricated or manufactured in a manner similar to components or subassemblies produced while aircraft 2400 is in service 2312 in FIG. 23. As yet another example, one or more apparatus embodiments, method embodiments, or a combination thereof may be utilized during production stages, such as component and subassembly manufacturing 2306 and system integration 2308 in FIG. 23. One or more apparatus embodiments, method embodiments, or a combination thereof may be utilized while aircraft 2400 is in service 2312 and/or during maintenance and service 2314 in FIG. 23. The use of a number of the different illustrative embodiments may substantially expedite the assembly of and/or reduce the cost of aircraft 2400.

Thus, the illustrative embodiments provide a method and apparatus for personnel, such as shop floor personnel to make extensive use of three-dimensional visualization of assembly models representing physical assemblies. For example, in many cases, shop floor personnel may be interested in seeing behind fuselage skins, interior walls, blankets, and other types of components in order to understand detailed structure that may affect repairs. This understanding may also be needed to help avoid assembly and disassembly errors.

The illustrative embodiments provide a method and apparatus for exposing the portion of an assembly that is not readily visible to the naked eye using three-dimensional computer visualization. As one illustrative example, a user may move a pointer over an item of an assembly model in a graphical user interface, which may make the item appear transparent. A further selection of the item may remove the item from the assembly model displayed. This removal may be recorded as an entry in an assembly hierarchy displayed in the graphical user interface. The sequence of item removals, as well as reverse sequence, may be stored and made available for use in traversing between various states of the assembly model.

While traversing these sequences, the user may be able to modify the assembly hierarchy, and, in particular, the various states of the assembly model captured by the sequence being tracked by the assembly hierarchy. Sub-items that make up items of the assembly model may be dynamically hidden. Thus, an entire item may not need to be removed to gain access to particular items or sub-items of interest.

The type of three-dimensional computer visualization of an assembly model provided by the illustrative embodiment may be especially useful in performing urgent tasks and operations when the personnel available are limited and time is of the essence. In some cases, the building of an assembly hierarchy by the removal of items from an assembly model for performing these types of urgent tasks and operations may be referred to as an emergent removal process.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a display of an assembly model, the method comprising:
displaying the assembly model in an initial state within a first display area in a graphical user interface, wherein the assembly model is a three-dimensional representation of an assembly that comprises a plurality of items, wherein a number of the items are not visible to a user when the assembly model is in the initial state;
changing a first display state of a first outermost item of the assembly model to a second display state within the first display area in response to receiving a first type of input, wherein changing the first display state of the first item to the second display state comprises changing a solid view of the first outermost item of the assembly model to a transparent view in the graphical user interface, wherein remaining inner items behind the outermost item are exposed in a solid view;
changing the second display state of the first outermost item to a third display state within the first display area in response to receiving a second type of input, wherein changing the second display state of the first outermost item to the third display state comprises changing the transparent view of the first outermost item of the assembly model to a hidden view in the graphical user interface, wherein the remaining inner items behind the outermost item remain exposed in solid view; and
adding an entry to an assembly hierarchy within a second display area in the graphical user interface in response to the second display state of the first outermost item changing to the third display state, wherein the assembly hierarchy tracks a sequence from outer to inner of item removals from the assembly model, wherein traversing the sequence and a reverse sequence enables the user to change between different selected states of the model to gain visual access to particular inner items of interest within the assembly.

2. The method of claim 1 further comprising:
repeating the steps of changing the first display state of a next outermost item, changing the second display state of the next outermost item, and adding the entry to the assembly hierarchy until a selected state of the assembly model is displayed within the first display area, wherein the assembly hierarchy comprises a stack of entries and tracks a sequence of how the initial state of the assembly model displayed in the first display area of the graphical user interface changes to the selected state for the assembly model.

3. The method of claim 2 further comprising:
performing a task related to a physical assembly represented by the assembly model using the display of the assembly model in the selected state, wherein the task includes at least one of repairing a part, replacing a part, imaging a part, installing a part, testing a part, or marking a part.

4. The method of claim 2 further comprising:
changing the selected state of the assembly model displayed in the first display area to a new selected state according to a reverse sequence in response to a third type input on the assembly model in the first display area.

5. The method of claim 2, wherein changing the selected state of the assembly model displayed comprises:
changing the selected state of the assembly model displayed in the first display area to a new selected state according to a reverse sequence that is a reverse of the sequence tracked by the assembly hierarchy based on a first directional input received from an input device.

6. The method of claim 5 further comprising:
changing the new selected state of the assembly model displayed in the first display area back to the selected state of the assembly model according to the sequence tracked by the assembly hierarchy based on a second directional input received from the input device.

7. The method of claim 1 further comprising:
displaying a plurality of sub-entries in association with one entry in a stack of entries in the second display area of the graphical user interface.

8. The method of claim 1, wherein changing the first display state of the first outermost item to the second display state comprises:
displaying a number of graphical indicators in association with the first outermost item in the graphical user interface.

9. The method of claim 1 wherein the first type of input comprises positioning a pointer over an item in the first display area, the second type of input clicking while the pointer is positioned over the item.

10. A method for managing a display of an assembly model that represents a physical assembly, the method comprising:
displaying the assembly model in an initial state within a first display area in a graphical user interface, wherein the assembly model is a three-dimensional representation of an assembly that comprises a plurality of items, wherein a number of the items are not visible to a user when the assembly model is in the initial state;
changing the initial state of the assembly model displayed in the graphical user interface to a selected state for the assembly model based on user input, wherein changing from the initial state to the selected state comprises:
changing a first outermost item of the assembly model from a solid view to a transparent view in response to receiving a first type of input, wherein remaining inner items behind the outermost item are exposed in solid view; and
changing the first outermost item from the transparent view to a hidden view in response to receiving a second type of input, wherein the remaining inner items behind the outermost item remain exposed in solid view, wherein the selected state for the assembly model is selected to aid in performing at least one task on the physical assembly;
building, dynamically, an assembly hierarchy in a second display area of the graphical user interface during changing of the initial state of the assembly model to the selected state, wherein the assembly hierarchy tracks a sequence from outer items to inner items of how the initial state of the assembly model displayed in the graphical user interface changes to the selected state for the assembly model; and
changing the selected state of the assembly model displayed in the first display area to a new selected state according to a reverse sequence in response to an input on the assembly model in the first display area.

11. An apparatus comprising:
a display manager that displays a graphical user interface, wherein the graphical user interface comprises:
a first display area for visually presenting an assembly model in an initial state, wherein the assembly model is a three-dimensional representation of an assembly that comprises a plurality of items, wherein a number of the items are not visible to a user when the assembly model is in the initial state, wherein:
a solid display state of a first outermost item of the assembly model is changed to a transparent display state in response to receiving a first type of input, wherein inner items behind the outermost item are exposed in solid view;
the transparent display state of the first outermost item is changed to a hidden display state in response to receiving a second type of input, wherein the remaining inner items behind the outermost item remain exposed in solid view; and
a second display area for visually presenting an assembly hierarchy that tracks a sequence from outer items to inner items of how the initial state of the assembly model changes to a selected state within the first display area as items in the assembly model are changed to the hidden display state;
wherein the selected state of the assembly model displayed in the first display area is changed to a new selected state according to a reverse sequence in response to a third type of input on the assembly model in the first display area.

12. The apparatus of claim 11 further comprising:
a display system, wherein the graphical user interface is displayed on the display system.

13. The apparatus of claim 11 further comprising:
an input device in communication with at least one of the graphical user interface or the display manager, wherein the first type of input, the second type of input, and the third type of input are received from the input device.

14. The apparatus of claim 11, wherein the first outermost item represents one of a part, a sub-assembly, and an assembly.

15. The apparatus of claim 11, wherein the assembly model represents a physical assembly and wherein the selected state for the assembly model is selected based on a task that is to be performed on the physical assembly.

16. The apparatus of claim 11, wherein the first type of input comprises moving a mouse pointer on the display over the item, the second type of input comprises clicking a scroll wheel on the mouse, and the third type of input comprises rolling the scroll wheel.

* * * * *